US010487250B2

(12) United States Patent
Matsukawa et al.

(10) Patent No.: US 10,487,250 B2
(45) Date of Patent: Nov. 26, 2019

(54) CATIONICALLY PHOTOPOLYMERIZABLE COMPOSITION, BONDING METHOD, ELECTRONIC DEVICE, METHOD FOR MANUFACTURING ELECTRONIC DEVICE, DISPLAY DEVICE AND METHOD FOR MANUFACTURING DISPLAY DEVICE

(71) Applicant: Panasonic Intellectual Property Management Co., Ltd., Osaka (JP)

(72) Inventors: Yozo Matsukawa, Mie (JP); Akira Ito, Fukushima (JP); Kenji Kitamura, Mie (JP); Morio Nakatani, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/328,360

(22) PCT Filed: Mar. 11, 2016

(86) PCT No.: PCT/JP2016/001386
§ 371 (c)(1),
(2) Date: Jan. 23, 2017

(87) PCT Pub. No.: WO2016/143360
PCT Pub. Date: Sep. 15, 2016

(65) Prior Publication Data
US 2017/0218236 A1    Aug. 3, 2017

(30) Foreign Application Priority Data

Mar. 12, 2015  (JP) ................. 2015-049822
May 12, 2015  (JP) ................. 2015-097440
May 19, 2015  (JP) ................. 2015-102073

(51) Int. Cl.
*C09J 163/00*    (2006.01)
*C08L 63/00*    (2006.01)
*B32B 7/12*    (2006.01)
*B32B 37/12*    (2006.01)
*C09J 5/06*    (2006.01)
*C08G 59/22*    (2006.01)
*C08G 59/68*    (2006.01)
*C09J 5/00*    (2006.01)
*G06F 1/16*    (2006.01)
*B32B 27/06*    (2006.01)
*B32B 27/28*    (2006.01)
*B32B 27/30*    (2006.01)
(Continued)

(52) U.S. Cl.
CPC ............... *C09J 163/00* (2013.01); *B32B 3/04* (2013.01); *B32B 3/08* (2013.01); *B32B 3/30* (2013.01); *B32B 7/12* (2013.01); *B32B 17/06* (2013.01); *B32B 27/06* (2013.01); *B32B 27/28* (2013.01); *B32B 27/302* (2013.01); *B32B 27/308* (2013.01); *B32B 27/32* (2013.01); *B32B 27/36* (2013.01); *B32B 27/365* (2013.01); *B32B 37/12* (2013.01); *C08G 59/223* (2013.01); *C08G 59/68* (2013.01); *C08L 63/00* (2013.01); *C09J 5/00* (2013.01); *C09J 5/06* (2013.01); *G06F 1/1637* (2013.01); *B32B 2250/02* (2013.01); *B32B 2255/00* (2013.01); *B32B 2255/10* (2013.01); *B32B 2255/26* (2013.01); *B32B 2307/412* (2013.01); *B32B 2307/51* (2013.01); *B32B 2307/71* (2013.01); *B32B 2307/712* (2013.01); *B32B 2363/00* (2013.01); *B32B 2405/00* (2013.01); *B32B 2457/20* (2013.01); *B32B 2457/202* (2013.01); *B32B 2457/204* (2013.01); *B32B 2457/206* (2013.01); *B32B 2457/208* (2013.01); *C09J 2205/31* (2013.01); *C09J 2463/00* (2013.01)

(58) Field of Classification Search
CPC ........ C09J 163/00; C09J 5/06; C09J 2205/31; B32B 7/12; B32B 37/12; C08G 59/223; C08G 59/68; C08L 63/00; G06F 1/1637
USPC .................................................. 522/168, 170
See application file for complete search history.

(56) References Cited

U.S. PATENT DOCUMENTS 8,197,053 B2 *  6/2012  Miura ................. B41M 5/0023
                                                                  347/102
2003/0059708 A1    3/2003  Yamamura et al.
(Continued)

FOREIGN PATENT DOCUMENTS

JP    2000-109511 A    4/2000
JP    2002-060463 A    2/2002
(Continued)

OTHER PUBLICATIONS

"Application of Oxetane Compound to Photocation Curing System," Toagosei Research Annual Report TREND, 1999, vol. 2, with partial English translation.
(Continued)

*Primary Examiner* — Sanza L. McClendon
(74) *Attorney, Agent, or Firm* — McDermott Will & Emery LLP

(57) ABSTRACT

The cationically photopolymerizable composition according to the present disclosure includes: (A) a polyfunctional epoxy compound having two or more epoxy groups per molecule; (B) a monofunctional epoxy compound having one epoxy group per molecule; (C) a photocation generator; and (D) an oxetane compound. At least one of the component (A) and the component (B) contains an epoxy compound ((A1) or (B1)) having a polyether backbone per molecule. A mass ratio of the component (A) to the component (B) falls within a range of 90:10 to 30:70.

10 Claims, 13 Drawing Sheets

(51) Int. Cl.
*B32B 27/32* (2006.01)
*B32B 27/36* (2006.01)
*B32B 3/04* (2006.01)
*B32B 3/08* (2006.01)
*B32B 3/30* (2006.01)
*B32B 17/06* (2006.01)

(56) References Cited

U.S. PATENT DOCUMENTS

2004/0106692 A1 6/2004 Yamamura et al.
2009/0079706 A1 3/2009 Mishima et al.
2014/0242396 A1 8/2014 Kanagawa et al.

FOREIGN PATENT DOCUMENTS

| JP | 2004-189895 A | 7/2004 |
| JP | 2005-225961 A | 8/2005 |
| JP | 2005225961 A * | 8/2005 |
| JP | 2006-117564 A | 5/2006 |
| JP | 2007-084637 A | 4/2007 |
| JP | 2009-062459 A | 3/2009 |
| JP | 2012-017368 A | 1/2012 |
| JP | 6134327 B2 | 1/2013 |
| JP | 2013-091676 A | 5/2013 |
| JP | 6321931 B1 | 10/2013 |
| WO | 2011/040438 A1 | 4/2011 |
| WO | 2014/080972 A1 | 5/2014 |
| WO | 2015/005210 A1 | 1/2015 |
| WO | 2015/005211 A1 | 1/2015 |

OTHER PUBLICATIONS

International Search Report issued in Application No. PCT/JP2016/001386 dated May 31, 2016, with English translation.

* cited by examiner

CATIONICALLY PHOTOPOLYMERIZABLE COMPOSITION, BONDING METHOD, ELECTRONIC DEVICE, METHOD FOR MANUFACTURING ELECTRONIC DEVICE, DISPLAY DEVICE AND METHOD FOR MANUFACTURING DISPLAY DEVICE

RELATED APPLICATIONS

This application is the U.S. National Phase under 35 U.S.C. § 371 of International Application No. PCT/JP2016/001386, filed on Mar. 11, 2016, which in turn claims the benefit of Japanese Application No. 2015-049822, filed on Mar. 12, 2015, Japanese Application No. 2015-097440, filed May 12, 2015, and Japanese Application No. 2015-102073, filed May 19, 2015, the disclosures of which are incorporated by reference herein.

TECHNICAL FIELD

The present disclosure relates to cationically photopolymerizable compositions, bonding methods, electronic devices and methods for manufacturing the electronic device, and display devices and methods for manufacturing the display device, and more specifically, to a cationically photopolymerizable composition suitable as an adhesive and a bonding method including bonding with as an adhesive the cationically photopolymerizable composition, and a method for manufacturing an electronic device which includes the bonding method, and an electronic device produced by the method for manufacturing the electronic device, and a method for manufacturing a display device which includes the bonding method, and a display device produced by the method for manufacturing the display device.

BACKGROUND ART

A cationically photopolymerizable composition has heretofore been used in applications such as an adhesive, a photoresist, a paint, and a sealing material. The cationically photopolymerizable composition is cured by irradiation with an active energy ray, such as UV light or visible light. Accordingly, the composition does not require heating and can be cured in a short time period. An acrylic resin-photoradical curing-type composition or an epoxy resin-photocation curing-type composition has been known as the cationically photopolymerizable composition. When each of those cationically photopolymerizable compositions is irradiated with an active energy ray having a proper wavelength and proper intensity, its curing is completed within from several seconds to several tens of seconds.

Literatures 1 to 5 described below disclose various cationically photopolymerizable compositions.

Literature 1 (JP 2000-109511 A) discloses a cationically photopolymerizable composition containing: a cationically photopolymerizable compound having at least one vinyl ether group per molecule; a cationic photopolymerization initiator; and a weakly basic substance.

Literature 2 (JP 2004-189895 A) discloses a photopolymerizable composition containing a cationically polymerizable compound, a cationic photopolymerization initiator, and a monofunctional vinyl monomer, in which the cationically polymerizable compound is obtained by blending an epoxy resin having two or more glycidyl groups per molecule and an epoxy resin having one glycidyl group per molecule at a ratio of 100:10 to 100:150, and 100 parts by weight of the canonically polymerizable compound is blended with 5 parts by weight to 30 parts by weight of the monofunctional vinyl monomer (see claim 1).

Literature 3 (JP 2013-091676 A) discloses a UV-curable resin composition containing 30 parts by mass to 95 parts by mass of a polyfunctional epoxy resin, and 5 parts by mass to 70 parts by mass of a monofunctional epoxy compound having a long-chain hydrocarbon backbone having 7 to 20 carbon atoms (see claim 1). In addition, Literature 3 discloses that the UV-curable resin composition contains a polyfunctional oxetane resin (see claim 2) and contains a photopolymerization initiator, such as an ionic photoacid generation-type initiator (see paragraph 0037).

Literature 4 (WO 2015/005210 A1) discloses a cationically polymerizable composition containing a monofunctional epoxy compound and an energy ray-sensitive cationic polymerization initiator (see claim 1). In addition, Literature 4 discloses that the cationically polymerizable composition may contain an oxetane compound (see claim 6). Further, Patent Literature 4 discloses, as in Example 16 and the like, a composition containing a polyfunctional epoxy compound, a monofunctional epoxy compound, an oxetane compound, and a cationic polymerization initiator.

Literature 5 (JP 2005-225961 A) discloses a canonically photopolymerizable composition containing a diglycidyl ether (a) of polyalkylene glycol-added bisphenol A, a bisphenol-type epoxy compound (b) except the (a), and a photocationic catalyst (see claim 1). In addition, Literature 5 discloses that the composition can be blended with a cationically polytnerizable compound, such as oxetane (see paragraph 0018).

However, each of the cationically photopolymerizable compositions disclosed in Literatures 1 and 2 contains the weakly basic substance or the monofunctional vinyl monomer, and hence after the curing of the cationically photopolymerizable composition, the weakly basic substance or the monofunctional vinyl monomer may bleed out (exude) to the surface of a cured product. Accordingly, adhesive performance by the cured product of the cationically photopolymerizable composition is impaired or the deterioration of the appearance of the cured product occurs in some cases.

In addition, each of the cationically photopolymerizable compositions disclosed in Literatures 3, 4, and 5 contains the polyfunctional oxetane resin or the oxetane compound. Accordingly, immediately after the cationically photopolymerizable composition has been irradiated with, for example, UV light, its viscosity may abruptly increase, and hence the working life of the cationically photopolymerizable composition is not sufficiently obtained in some cases.

SUMMARY

It is an object of the present disclosure to provide a cationically photopolymerizable composition that can secure a sufficient working life, that can shorten curing completion time required after a lapse of the working life, and that can suppress the occurrence of bleeding-out after its curing.

A cationically photopolymerizable composition according to one aspect of the present disclosure includes:
(A) a polyfunctional epoxy compound having two or more epoxy groups per molecule;
(B) a monofunctional epoxy compound having one epoxy group per molecule;
(C) a photocation generator; and
(D) an oxetane compound, in which:

at least one of the component (A) and the component (B) contains an epoxy compound having a polyether backbone per molecule; and a mass ratio of the component (A) to the component (B) falls within a range of 90:10 to 30:70.

Advantageous Effects

The cationically photopolymerizable composition according to the aspect of the present disclosure contains the epoxy compound having the polyether backbone per molecule, and thereby can secure a sufficient working life defined as time from irradiation with an active energy ray to the bonding of members. In addition, the cationically photopolymerizable composition according to the aspect of the present disclosure contains the oxetane compound and thereby can shorten curing completion time required after a lapse of the working life. Moreover, the cationically photopolymerizable composition according to the aspect of the present disclosure has the polyether backbone present in a molecule of the epoxy compound and thereby can suppress the occurrence of bleeding-out after its curing.

A bonding method according to one aspect of the present disclosure can secure the sufficient working life defined as time from the irradiation with the active energy ray to the bonding of the members because the cationically photopolymerizable composition is used as an uncured adhesive. In addition, the bonding method according to the aspect of the present disclosure can shorten curing completion time required after a lapse of the working life of the uncured adhesive because the uncured adhesive contains the oxetane compound. Moreover, in the bonding method according to the aspect of the present disclosure, the uncured adhesive has the polyether backbone present in a molecule of the epoxy compound is used, and hence it is possible to suppress the occurrence of bleeding-out after the curing of the adhesive.

In each of an electronic device and a display device according to aspects of the present disclosure, a cured product of the cationically photopolymerizable composition serves as an adhesive, and thus it is possible to achieve bonding at a desired adhesive strength. In particular, when the adhesive contains an elastomer, the electronic device and the display device are each excellent in impact resistance.

DETAILED DESCRIPTION

Figure 1:
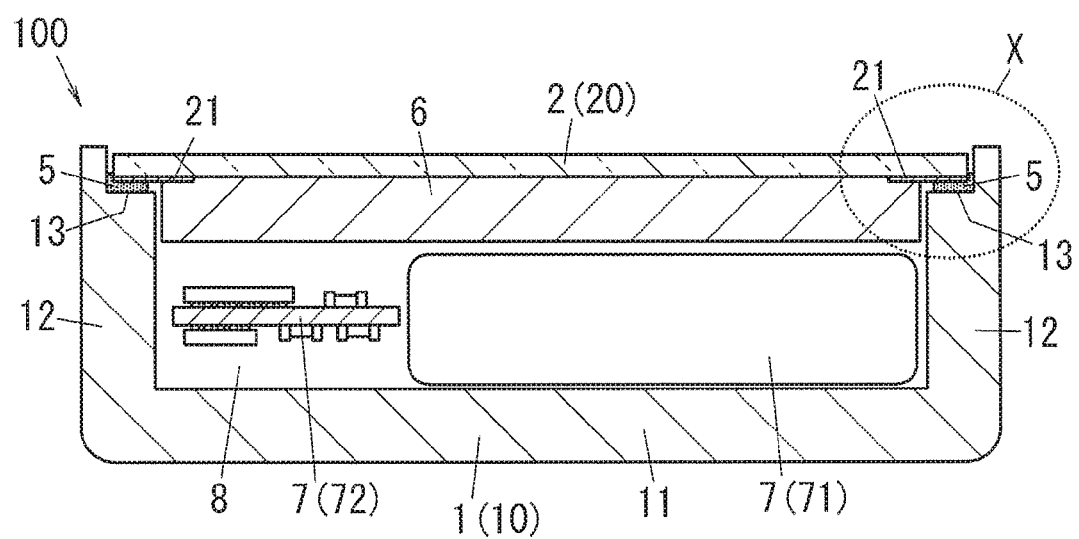
FIG. 1 relates to an electronic device according to one embodiment of the present disclosure, and is a sectional view taken along the line Y-Y of FIG. 2.

Embodiments of the present disclosure are described below.

[Outline of Cationically Photopolymerizable Composition]

A cationically photopolymerizable composition according to the present embodiment includes: (A) a polyfunctional epoxy compound having two or more epoxy groups per molecule (hereinafter referred to as "component (A)" as needed); (B) a monofunctional epoxy compound having one epoxy group per molecule (hereinafter referred to as "component (B)" as needed); (C) a photocation generator (hereinafter referred to as "component (C)" as needed); and (D) an oxetane compound (hereinafter referred to as "component (D)" as needed). in addition, the cationically photopolymerizable composition according to the present embodiment may include (E) an elastomer (hereinafter referred to as "component (E)" as needed) in addition to the component (A), the component (B), the component (C), and the component (D). The cationically photopolymerizable composition according to the present embodiment has retarded curability and hence can be used as, for example, a retarded curing-type adhesive.

The cationically photopolymerizable composition according to the present embodiment may be blended with any one of arbitrary components, such as various resins and additives, as required to the extent that the retarded curability is not impaired.

[Component (A)]

The polyfunctional epoxy compound having two or more epoxy groups per molecule serving as the component (A) is a compound having two or more epoxy groups as functional groups per molecule.

The component (A) contains at least one of a polyfunctional epoxy compound (A1) having a polyether backbone (skeleton) per molecule or a polyfunctional epoxy compound (A2) free of any polyether backbone per molecule.

Examples of the polyfunctional epoxy compound (A1) include polyethylene glycol diglycidyl ether, polypropylene glycol diglycidyl ether, and polytetram.ethylene glycol diglycidyl ether. One kind of the compounds may be used alone as the polyfunctional epoxy compound (A1) or more kinds thereof may be used in combination.

Examples of the polyfunctional epoxy compound (A2) include a bisphenol A-type epoxy resin, a bisphenol F-type epoxy resin, a bisphenol S-type epoxy resin, a hydrogenated bisphenol A-type epoxy resin, a hydrogenated bisphenol F-type epoxy resin, a biphenyl-type epoxy resin having a biphenyl backbone, a naphthalene ring-containing epoxy resin, an anthracene ring-containing epoxy resin, an alicyclic epoxy resin, a dicyclopentadiene-type epoxy resin having a dicyclopentadiene backbone, a phenol novolac-type epoxy resin, a cresol novolac-type epoxy resin, a triphenylmethane-type epoxy resin, a bromine-containing epoxy resin, an aliphatic epoxy resin, an aliphatic polyether-based epoxy resin, and triglycidyl isocyanurate. One kind of the compounds may be used alone as the polyfunctional epoxy compound (A2), or two or more kinds thereof may be used in combination.

The term "polyether backbone" as used herein means the following chemical structural formula (1):

[Formula 1]

(1)

in the chemical structural formula (1), R represents a divalent hydrocarbon group having 1 to 30 carbon atoms, and m represents an integer of 2 to 60.

In particular, a polyether backbone in which R represents a hydrocarbon group having 1 to 10 carbon atoms is suitable because the backbone exhibits a significant lengthening effect on the retardation time of the cationically photopolymerizable composition according to the present embodiment.

[Component (B)]

The monofunctional epoxy compound having one epoxy group per molecule serving as the component (B) is a compound having one epoxy group as a functional group per molecule.

The component (B) contains at least one of a monofunctional epoxy compound (B1) having a polyether backbone per molecule or a monofunctional epoxy compound (B2) free of any polyether backbone per molecule, Examples of the monofunctional epoxy compound (B1) include polyethylene glycol monoglycidyl ether, polypropylene glycol monoglycidyl ether, and polytetramethylene glycol monoglycidyl ether, One kind of the compounds may be used alone as the monofunctional epoxy compound (B1), or two or more kinds thereof may be used in combination.

Examples of the monofunctional epoxy compound (B2) include an alkyl glycidyl ether, phenyl glycidyl ether, p-tert-butylphenyl glycidyl ether, cresyl glycidyl ether, biphenyl glycidyl ether, glycol glycidyl ether, an alkylphenol glycidyl ether, cyclohexene oxide, and a fatty acid glycidyl ester. One kind of the compounds may be used alone as the monofunctional epoxy compound (B2), or two or more kinds thereof may be used in combination.

[Component (C)]

The photocation generator (cationic photopolymerization initiator) serving as the component (C) is an initiator for subjecting an epoxy group (and, in some cases, an oxetane group) to ring-opening self-polymerization by generating a strongly acidic chemical species through irradiation with an active energy ray, such as UV light or visible light. Such photocation generator is not particularly limited, and for example, the generator may be an ionic photoacid generator, or may be a nonionic photoacid generator. Each of the ionic photoacid generator and the nonionic photoacid generator may be used alone as the photocation generator, or the ionic photoacid generator and the nonionic photoacid generator may be used in combination.

Examples of the ionic photoacid generator include onium salts, such as an aromatic diazonium salt, an aromatic halonium salt, and an aromatic sulfonium salt, and organic metal complexes, such as an iron-arene complex, a titanocene complex, or an aryl silanol-aluminum complex. One kind of the compounds may be used alone as the ionic photoacid generator, or two or more kinds thereof may be used in combination.

Examples of the nonionic photoacid generator include a nitrobenzyl ester, a sulfonic acid derivative, a phosphoric acid ester, a phenolsulfonic acid ester, diazonaphthoquinone, and N-hydroxyimide phosphonate. One kind of the compounds may be used alone as the nonionic photoacid generator, or two or more kinds thereof may be used in combination.

[Component (D)]

The oxetane compound serving as the component (D) is a curing accelerator for improving the curing sharpness of the cationically photopolymerizable composition. The term "curing sharpness" refers to such a property that the curing rate (increase in viscosity per unit time) of the cationically photopolymerizable composition abruptly increases in a short time period, and hence a time period required for its curing to be completed is shortened. Examples of such oxetane compound include 3-ethyl-3-hydroxymethyloxetane, 2-ethylhexyloxetane, xylylenebisoxetane, and 3-ethyl-3{[(3-ethyloxetan-3-yl)methoxy]methyl}oxetane. One kind of the compounds may be used alone as the oxetane compound, or two or more kinds thereof may be used in combination.

[Component (E)]

The elastomer serving as the component (E) changes the physical characteristics and chemical characteristics of a cured product of the cationically photopolymerizable composition. That is, changes in physical characteristics of the cured product of the cationically photopolymerizable composition containing the elastomer, such as an improvement in strength, a reduction in elastic modulus, and an improvement in elongation ratio, occur as compared to a cured product of a cationically photopolymerizable composition free of any elastomer. In addition, changes in chemical characteristics of the cured product of the cationically photopolymerizable composition containing the elastomer, such as the strengthening of a chemical interaction with an adherend (a first member 1 or a second member 2 to be described later) by a polar group in the elastomer, and the formation of a chemical bond with the adherend by a cationically polymerizable substituent in the elastomer, occur as compared to the cured product of the cationically photopolymerizable composition free of any elastomer. When such changes in chemical characteristics occur, adhesiveness (adhesive strength) between the cured product of the cationically photopolymerizable composition and the adherend may be improved.

The elastomer is formed of various polymer substances, such as polyolefin-, polystyrene-, polyester-, polyurethane-, and silicone-based substances. In addition, it is more preferred that each of those elastomers be modified with a substituent having large polarity, such as a carboxyl group, a hydroxyl group, a cyano group, a thiol group, or an amino group, or be modified with a cationically polymerizable substituent, such as an epoxy group or an oxetane group. This is because there is a possibility that the physical characteristics and chemical characteristics of a modified elastomer are improved as compared to the case where the modification is not performed. One kind of the elastomers may be used alone, or two or more kinds thereof may be used in combination.

The form of the elastomer in the cationically photopolymerizable composition is not particularly limited, and the elastomer may be particles, or may be in a state of being dissolved in the component (A) or the component (B). Alternatively, both the forms, i.e., the particles and the dissolved state may coexist.

[Preparation of Cationically Photopolymerizable Composition]

The cationically photopolymerizable composition according to the present embodiment is prepared to include the component (A), the component (B), the component (C), and the component (D). In addition, the cationically photopolymerizable composition according to the present embodiment is prepared to include the component (A), the component (B), the component (C), and the component (D) and further include the component (E) as required.

Further, the cationically photopolymerizable composition according to the present embodiment contains one or both of the polyfunctional epoxy compound (A1) and the monofunctional epoxy compound (B1).

A blending ratio by mass of the component (A) to the component (B) at the time of the preparation of the cationically photopolymerizable composition falls within the range of 90:10 to 30:70. Although the retardation time of the ring of the cationically photopolymerizable composition varies depending on, for example, the blending amounts and kinds of the respective components, in general, the retardation time shortens as the amount of the component (B) reduces, and in contrast, the retardation time of the curing lengthens as the amount of the component (B) increases.

The term "retardation time" refers to the time period for which the cationically photopolymerizable composition maintains a liquid state after the irradiation with the active energy ray. In this case, the term "liquid state" refers to a state in which the viscosity of the cationically photopolymerizable composition is 50,000 Pa·s or less. In addition, the term "curing" refers to a state in which the viscosity of the cationically photopolymerizable composition becomes more than 50,000 Pa·s. The long retardation time allows the application of the canonically photopolymerizable composition, the adhesion of members with the cationically photopolymerizable composition, and the like, and hence it can be said that the cationically photopolymerizable composition has a long working life and is excellent in handleability.

When the amount of the monofunctional epoxy compound serving as the component (B) is small and thus the ratio does not fall within the above range, it becomes difficult to secure a retardation time required for bonding or the like, and it becomes difficult to obtain a sufficient working life, and hence the handleability reduces in some cases. When the amount of the monofunctional epoxy compound serving as the component (B) is large and thus the ratio does not fall within the above ratio, sufficient three-dimensional crosslinking hardly occurs in the cured product of the cationically photopolymerizable composition, and hence the strength of the cured product of the cationically photopolymerizable composition reduces, and for example, it becomes difficult to obtain a sufficient adhesive force in some cases.

The mass ratio of the component (A) to the component (B) more preferably falls within the range of 85:15 to 40:60. The blending ratio by mass of the component (A) to the component (B) still more preferably falls within the range of 80:20 to 50:50.

in addition, a proportion by mass of the total amount of the epoxy compounds each having a polyether backbone per molecule (i.e., the total amount of the polyfunctional epoxy compound (A1) and the monofunctional epoxy compound (B1)) in both or one of the component (A) and the component (B) to the total amount of the epoxy compounds serving as the component (A) and the component (B) preferably falls within the range of 0.01 mass % to 90 mass %. The proportion by mass of the total amount of the epoxy compounds each having a polyether backbone per molecule in both or one of the component (A) and the component (B) to the total amount of the epoxy compounds serving as the component (A) and the component (B) more preferably falls within the range of 0.1 mass % to 30 mass %.

The blending amount of the component (C) is preferably from 0.01 part by mass to 10 parts by mass with respect to 100 parts by mass of the total mass of the component (A) and the component (B). When the blending amount of the photocation generator is smaller than 0.01 part by mass with respect to 100 parts by mass of the total mass of the component (A) and the component (B), the polymerization of the cationically photopolymerizable composition is not sufficiently performed, and hence an uncured portion remains in some cases. When the blending amount of the photocation generator is larger than 10 parts by mass with respect to 100 parts by mass of the total mass of the component (A) and the component (B), the curing reaction of the cationically photopolymerizable composition becomes so fast that its retarded curability is lost or its depth curability deteriorates (a nonuniform cured product is obtained) in some cases.

The proportion by mass of the blending amount of the component (D) to the total amount of the component (A) and the component (B) preferably falls within the range of 0.01 mass % to 30 mass %. In this case, the increase behavior of the viscosity of the cationically photopolymerizable composition at the time of its curing easily becomes sharper. Accordingly, when the cationically photopolymerizable composition is used as an adhesive, its curing time at normal temperature after bonding can be shortened, and the shortening leads to the shortening of a tact time. In addition, displacement does not occur at an early stage after the bonding, and hence an operation in the next step can be immediately initiated and production efficiency can be significantly improved. When the above proportion by mass of the blending amount of the component (D) is 0.01 mass % or less, the above-mentioned effects are small, and when the above proportion by mass of the blending amount is 30 mass % or more, the curing is so fast that it becomes difficult to secure a retardation time required for the bonding.

When the cationically photopolymerizable composition contains the component (E), the proportion by mass of the blending amount of the component (E) to the total amount of the component (A) and the component (B) preferably falls within the range of 0.1 mass % to 50 mass %. When the proportion by mass of the blending amount of the component (E) to the total amount of the component (A) and the component (B) falls within this range, it becomes easy to change the physical characteristics and chemical characteristics of the cured product of the cationically photopolymerizable composition. That is, when the above proportion by mass of the blending amount of the component (E) does not fall within this range, it becomes difficult to change the physical characteristics and chemical characteristics of the cured product of the cationically photopolymerizable composition.

A method of preparing the cationically photopolymerizable composition involves, for example, blending the component (A), the component (B), the component (C), and the component (D), and as required, the component (E) at a predetermined mass ratio to give a blend thereof, controlling the temperature of the blend to from 20° C. to 100° C., and then stirring the blend with a homodisper or the like until the blend has a uniform consistency. Thus, a substantially transparent and liquid cationically photopolymerizable composition is obtained.

[Curing Characteristic of Cationically Photopolymerizable Composition]

The cationically photopolymerizable composition according to the present embodiment shows such retarded curability that the composition maintains a liquid state immediately after the irradiation with the active energy ray, and cures after a lapse of a certain time period. Such a cationically photopolymerizable composition can be used as a retarded curing-type adhesive. The term "retarded curing-type adhesive" as used herein refers to an adhesive having a grace period for the positioning of members by maintaining a liquid state for a certain time period after the application of energy required for initiating its curing reaction (i.e., an adhesive having a long working life), and refers to such an adhesive that even when energy, such as light or heat, is not additionally applied after the positioning, its curing reaction sufficiently advances and hence its curing is completed. In addition, the adhesive is not activated and the curing reaction does not begin unless the retarded curing-type adhesive is irradiated with the active energy ray. Accordingly, unless the adhesive is irradiated with the active energy ray, the adhesive is hardly cured, and is hence different from an adhesive that spontaneously cures under an ordinary environment like a solvent-type adhesive or a cyanoacrylate-based instant adhesive.

The retardation time in the cationically photopolymerizable composition according to the present embodiment varies depending on, for example, the composition of the cationically photopolymerizable composition and the irradiation intensity of the active energy ray, and the temperature of the cationically photopolymerizable composition. When an actual positioning step in which the cationically photopolymerizable composition according to the present embodiment is used as an adhesive is assumed, it is preferred that after the composition maintain a liquid state for 5 seconds or more and 60 minutes or less after irradiation with an active energy ray having a wavelength of 365 nm at an irradiation dose of 50 mJ/cm$^2$ or more under an atmosphere having a temperature of 25° C., and then cure within 12 hours from the irradiation. The composition of the cationically photopolymerizable composition and the like are preferably adjusted so that the cationically photopolymerizable composition has such properties.

The case where the time period for which the cationically photopolymerizable composition according to the present embodiment maintains the liquid state after the irradiation with the active energy ray is less than 5 seconds is not practical because the grace period for the positioning is short. In the case where the composition maintains the liquid state for more than 60 minutes, a risk of causing the displacement of the members may increase, and a time period required for the curing to be completed lengthens. In addition, an appropriate time period required for a sufficient strength of the cured product to be exhibited through the completion of the curing is considered to be 12 hours or less from the viewpoint of productivity. Of course, the time period is considered to be desirably as short as possible. In addition, an appropriate irradiation dose of the active energy ray is 50 mJ/cm$^2$ or more. When the irradiation dose falls short of the value, the amount of a cation species to be generated by the irradiation with the active energy ray is so small that there is a risk in that the polymerization reaction of the composition stops in midstream and hence the composition may cure incompletely. In addition, as the irradiation dose of the active energy ray increases, the polymerization reaction becomes faster, and hence the retardation time and the curing completion time shorten. The polymerization reaction is also affected by a temperature. In the cationic polymerization of an epoxy compound, while the generation amount of a cation species has positive correlation with the irradiation dose of an active energy ray, light is not basically involved in the polymerization reaction, and the reaction is affected by a temperature. Accordingly, the polymerization reaction becomes slower under lower temperatures, and the polymerization reaction becomes faster under higher temperatures. In consideration of this fact, the retardation time can be increased by irradiating the composition with the active energy ray at low temperature before the positioning. In addition, the curing time can be shortened by heating the composition after the positioning.

The mechanism via which the cationically photopolymerizable composition according to the present embodiment shows retarded curability is as described below. When the photocation generator absorbs the active energy ray, the generator generates cations and the cations initiate the cationic polymerization of the monofunctional epoxy compound serving as the component (B) present in a large amount in the cationically photopolymerizable composition. The molecules of the monofunctional epoxy compound undergo the cationic polymerization to show an increase in molecular weight. However, the compound has only one epoxy group per molecule, and hence the molecules do not three-dimensionally crosslink with each other but linearly grow. Accordingly, at the initial stage of the reaction, the composition shows substantially no increase in viscosity and maintains the liquid state. In actuality, the polymerization reaction advances, but the composition seems to remain substantially unchanged as compared to its state before the irradiation with the active energy ray because the composition shows substantially no increase in viscosity and maintains the liquid state. After that, when the polymerization further advances to increase the molecular weight, the viscosity is increased by the entanglement of the molecular chains of a polymer of the monofunctional epoxy compound. In addition, the polyfunctional epoxy compound having two or more epoxy groups per molecule serving as the component (A) also undergoes a reaction to form a three-dimensional crosslinked structure, and thus the curing is finally completed. In the mechanism, the active energy ray is used only for causing the photocation generator to generate cations to initiate the polymerization reaction, and thereafter, the polymerization reaction spontaneously advances even when the irradiation with the active energy ray is stopped. As a result, the composition shows the following behavior of retarded curing: the composition maintains the liquid state for a certain time period after the irradiation with the active energy ray, and then fully cures even when the irradiation with the active energy ray or heating is not performed.

A photocurable resin composition showing the following behavior of a retarded curing-type adhesive as in the cationically photopolymerizable composition according to the present embodiment has heretofore been known (see Literature 1): the composition maintains a liquid state for a certain time period after irradiation with an active energy ray, and then fully cures. In the technology, an added poly-ether- or thioether-based curing retarder traps cation species generated from a photocation generator at the time of the photoirradiation to retard the initiation of a cationic polymerization reaction. The cationically photopolymerizable composition according to the present embodiment is different from the technology of Patent Literature 1 in that the composition controls not an initiation reaction but a polymerization reaction (growth reaction) subsequent thereto. In addition, the combination of the technology of Patent Literature 1 and the cationically photopolymerizable composition according to the present embodiment is assumed to exhibit more effective retarded curability because these technologies are not incompatible with each other.

In addition, in the cationically photopolymerizable composition according to the present embodiment, at least one of the component (A) and the component (B) contains an epoxy compound having a polyether backbone per molecule (i.e., the polyfunctional epoxy compound (A1) or the monofunctional epoxy compound (B1)). Accordingly, when the epoxy compound having the polyether backbone per molecule and cations are present, according to Le Chatelier's principle, the association and liberation of the polyether backbone and the cations occur in accordance with a change in concentration of liberated cations. That is, when a large amount of the cations is present in the cationically photopolymerizable composition, equilibrium shifts to an association side, and hence the amount of the liberated cations in the cationically photopolymerizable composition reduces. Meanwhile, when the amount of the liberated cations reduces, the equilibrium shifts to a liberation side, and hence the liberated cations can be supplied into the cationically photopolymerizable composition.

In general, when a photocation generator absorbs an active energy ray, the generator generates cations and the cations act on an epoxy compound to initiate cationic polymerization. In this case, when the generation amount of the cations is large, the polymerization reaction is fast, and when the generation amount is small, the polymerization reaction is slow.

In the retarded curing-type cationically photopolymerizable composition according to the present embodiment containing the epoxy compounds and the photocation generator as essential components, a large amount of cations are generated from the photocation generator immediately after irradiation with an active energy ray. While some of the generated cations react with the epoxy compounds to polymerize the epoxy compounds, the remaining cations associate with the polyether backbone to be brought into a state of being free from polymerizing the epoxy compounds. After that, when the cations for polymerizing the epoxy compounds are deactivated by a termination reaction, the amount of the cations in the cationically photopolymerizable composition reduces. Accordingly, the equilibrium of the liberation and association of the polyether backbone and the cations shifts to the liberation side, and hence the cations are newly supplied into the cationically photopolymerizable composition. Thus, the polymerization reaction of the epoxy compounds is continued.

The liberation and association of the polyether backbone and the cations advance irrespective of the irradiation with the active energy ray. Accordingly, even after the completion of the irradiation with the active energy ray, the cations are supplied along with the reduction in cation concentration caused by the deactivation, and hence the polymerization reaction of the epoxy compounds advances. As a result, the cationically photopolymerizable composition according to the present embodiment shows the following retarded curing-type behavior: the composition maintains a liquid state for a certain time period after the irradiation with the active energy ray, and then fully cures even when the irradiation with the active energy ray or heating is not performed. An increase in viscosity of the cationically photopolymerizable composition according to the present embodiment is gentle immediately after the initiation of the reaction (immediately after the irradiation with the active energy ray), and hence its retardation time is long. As a result, a long time for the adhesion of the members (working life) can be secured, and hence the composition is excellent in handleability.

In addition, in the cationically photopolymerizable composition according to the present embodiment, the polyether backbone is incorporated into a molecule of an epoxy compound serving as the component (A) or the component (B), and hence even after the curing of the cationically photopolymerizable composition, the bleeding-out (exudation or floating to the surface of the cured product of the cationically photopolymerizable composition) of the polyether backbone portion can be suppressed. If a compound having a polyether backbone is blended into the cationically photopolymerizable composition instead of the epoxy compound, the compound having the polyether backbone is hardly incorporated into the cured product of the cationically photopolymerizable composition, and hence the compound having the polyether backbone is liable to leave from the three-dimensional network structure of the cured product. Therefore, the bleeding-out of the compound having the polyether backbone is liable to occur.

In the cationically photopolymerizable composition according to the present embodiment, the mechanism via which its curing behavior is changed by adding the oxetane compound is assumed to be as described below. When the molecular weight of an epoxy compound or an oxetane compound is increased by a growth reaction, a cation species present at a terminal of the molecular chain of the compound moves into the molecular chain owing to chain transfer, and hence the polymerization of the compound substantially stops in some cases. It has been known that such chain transfer is liable to occur in the case of the epoxy compound, and relatively hardly occurs in the case of an oxetane resin (see Toagosei Research Annual Report TREND 1999 Vol. 2 "Application of Oxetane Compound to Photocation Curing System"). Accordingly, when the cationically photopolymerizable composition is free of any oxetane compound, the increase in viscosity of the cationically photopolymerizable composition is made moderate by an influence of the stopping of the polymerization of the epoxy compound caused by the chain transfer. In contrast, when the cationically photopolymerizable composition contains the oxetane compound, the stopping of the polymerization caused by the chain transfer hardly occurs, and hence the cationically photopolymerizable composition may steadily increase its molecular weight to show sharp viscosity increase behavior.

[Bonding Method]

The cationically photopolymerizable composition according to the present embodiment is suitable as an adhesive. Such a cationically photopolymerizable composition is a retarded curing-type adhesive. Accordingly, the time period for which the composition is a liquid after irradiation with an active energy ray for its curing is long, i.e., a working life for adhesion is long, and hence the composition is excellent in handleability. A bonding method in the case where the cationically photopolymerizable composition according to the present embodiment is used as an adhesive is performed, for example, as described below.

First, an uncured adhesive is placed on at least one of a first member and a second member serving as an adherend (adhesive-placing step). Next, the uncured adhesive is irradiated with an active energy ray after the adhesive-placing step (irradiating step). Next, the first member and the second member are positioned with the uncured adhesive in-between after the irradiating step (positioning step). Next, the uncured adhesive is fully cured to bond the first member and the second member to each other after the positioning step (curing step).

[Electronic Device and Method of Manufacturing the Same]

The following description is made to an electronic device and a method for manufacturing the same including the aforementioned bonding method. An adhesive used in each of the electronic device and the method for manufacturing the same is preferably a cationically photopolymerizable composition containing the component (A), the component (B), the component (C), the component (D), and the component (E). The adhesive contains the component (E), and hence the adhesive strength of the adhesive after curing and the like are easily improved as compared to the case where the adhesive does not contain the component (E).

Figure 2:
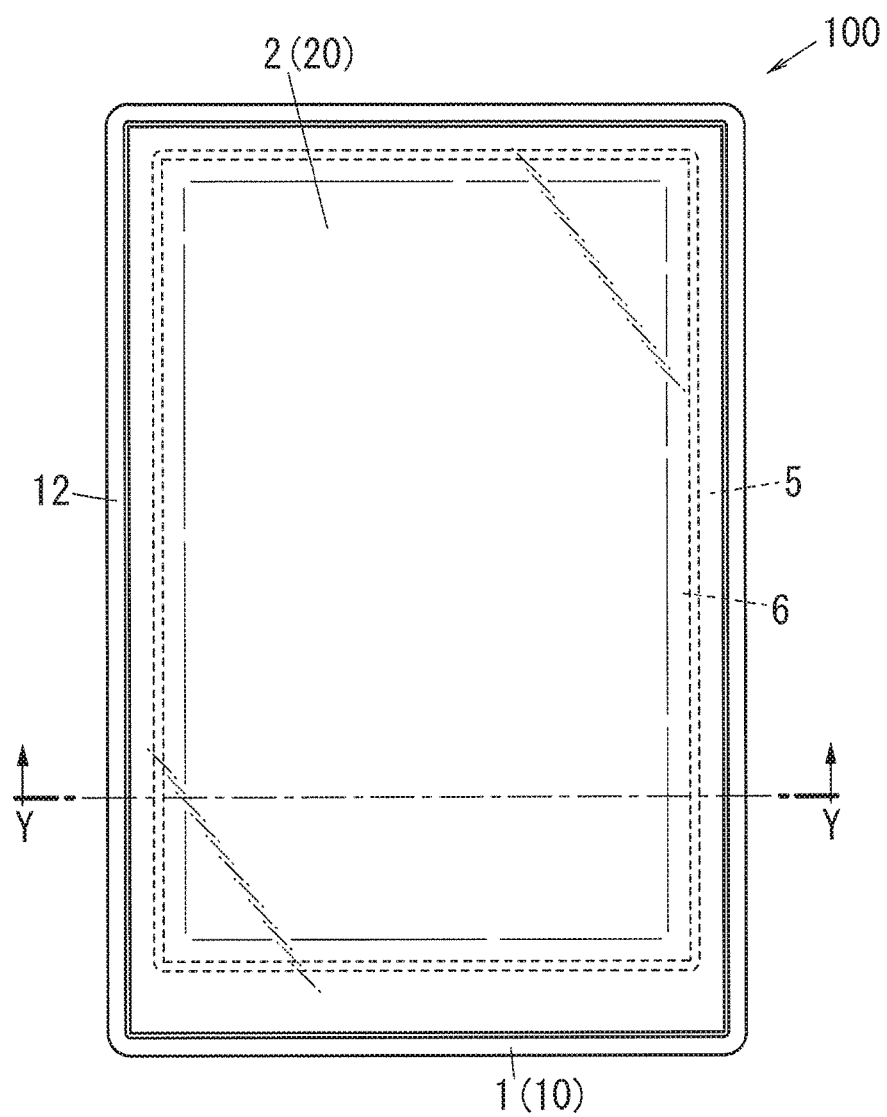
FIG. 2 is a front view of the above-mentioned electronic device.

FIG. 1 and FIG. 2 relate to an electronic device 100 exemplifying the electronic device. The electronic device 100 is a portable electronic device, such as a smart phone. Other examples of the electronic device include a portable game machine and a cellular phone. Downsizing, light-weighting, and a reduction in price have always been required in such a portable electronic device. In order to reduce the total weight of the device to the extent possible, a reduction in number of members for adhesion has been required, and adhesion in a thin line has been required in association with a reduction in adhesive area due to downsizing of the members. Further, a reduction in production cost for the reduction in price is extremely important. The adhesive formed of the cationically photopolymerizable composition satisfies those requirements.

The electronic device 100 includes at least a housing (frame) 10 serving as the first member 1 and a cover panel 20 serving as the second member 2. The housing 10 and the cover panel 20 are assembled by bonding them to each other with a cured adhesive 5. The electronic device 100 may include, for example, a battery 71, a circuit board 72, and a display unit 6, such as a liquid crystal panel, in addition to the foregoing.

The housing 10 is made of a plastic or a metal, and has a bottom portion 11 of a rectangular plate shape and a side wall portion 12 rising from the periphery of the bottom portion 11 toward a front surface. A space surrounded by the bottom portion 11 and the side wall portion 12 serves as an accommodating space 8. The housing 10 includes an opening on the opposite side from the bottom portion 11.

The cover panel 20 is made of a plastic or glass, and is formed into a rectangular plate shape. The cover panel 20 has transparency that does not cause any problem in the practical use of the electronic device 100. The cover panel 20 has a decorative printing portion 21 extending the entire length of the periphery of its rear surface. The decorative printing portion 21 has a light-shielding, property, and is used for preventing a portion covered with the decorative printing portion 21 (a portion inside the housing 10) from being viewed through the periphery of the cover panel 20. Therefore, the decorative printing portion 21 makes it difficult to view the cured adhesive 5 and the like. The decorative printing portion 21 is, for example, a printed film (ink film) formed by the screen printing of an acrylic or urethane-based ink. In addition, a coating having high UV absorbability is frequently provided to the cover panel 20 for improving weatherability. In this case, the panel is substantially unable to transmit light toward a portion below the lower surface of the decorative printing portion 21.

The accommodating space 8 accommodates parts 7 including the battery 71 and the circuit board 72. In addition, the display unit 6, such as a display, is placed on the rear surface of the cover panel 20 (a surface facing the accommodating portion 8) by adhesion or the like. The display unit 6 is also accommodated in the accommodating space 8 to be closer to the front surface than the parts 7 are.

Figure 3:
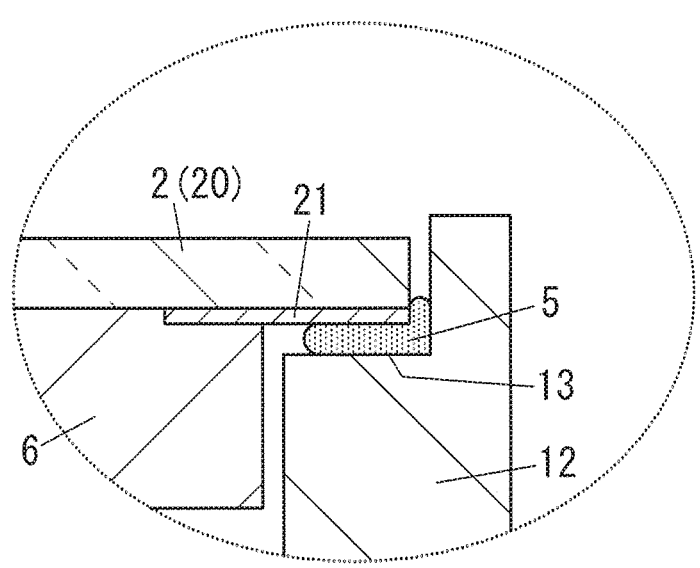
FIG. 3 relates to the above-mentioned electronic device, and is an enlarged sectional view of an X portion of FIG. 1.

The cured adhesive 5 is interposed between the housing 10 and the cover panel 20 to bond the housing 10 and the cover panel 20 to each other. As illustrated in FIG. 3, the cured adhesive 5 adheres to the housing 10 at the position of a recessed portion 13 formed in the front end of the side wall portion 12 (a periphery of an opening of the accommodating portion 8). The recessed portion 13 extends the entire length of the periphery of the side wall portion 12 so as to surround the opening of the accommodating portion 8. The cured adhesive 5 extends the entire length in the peripheral direction of the recessed portion 13. The cured adhesive 5 adheres to the cover panel 20 at the position of the decorative printing portion 21.

To manufacture the electronic device 100 by bonding the housing 10 and the cover panel 20 to each other, the adhesive-placing step, the irradiating step, the positioning step, and the curing step are sequentially performed.

Figure 4:
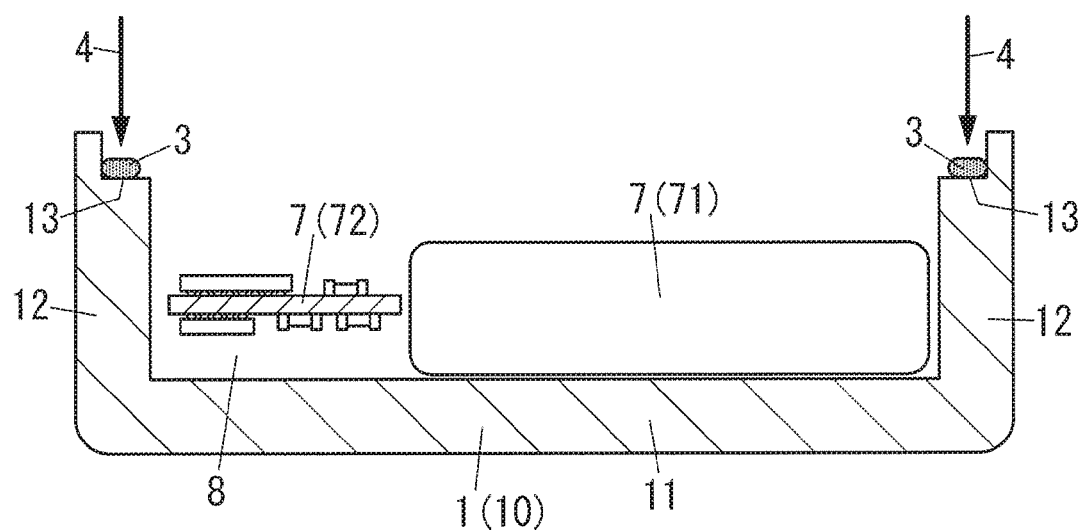
FIG. 4 is a sectional view for illustrating an irradiating step in a method of manufacturing an electronic device according to one embodiment of the present disclosure.

In the adhesive-placing step, an uncured adhesive 3 is placed on at least one of the housing 10 and the cover panel 20. Although the uncured adhesive 3 is placed on the recessed portion 13 of the housing 10 in FIG. 4. Alternatively, the uncured adhesive 3 may be placed on the surface of the decorative printing portion 21 of the cover panel 20. Alternatively, the uncured adhesive 3 may be placed on each of both the recessed portion 13 and the surface of the decorative printing portion 21. The uncured adhesive 3 may be placed by an arbitrary method, such as application and printing. The uncured adhesive 3 is placed, for example, at a mass per area of 5 mg/cm$^2$ to 50 mg/cm$^2$.

In the irradiating step, the uncured adhesive 3 is irradiated with an active energy ray 4 after the adhesive-placing step. The active energy ray 4 is UV light or visible light. The irradiation with the active energy ray 4 initiates the curing of the uncured adhesive 3. In addition, an amount of the active energy ray 4 required for the uncured adhesive 3 to be cured into the cured adhesive 5 is applied by the irradiating step. In the irradiation with the active energy ray 4, for example, a UV lamp is used. The irradiation dose of the active energy ray 4 may be in a range of, for example, 50 mJ/cm$^2$ to 3,000 mJ/cm$^2$.

Figure 5:
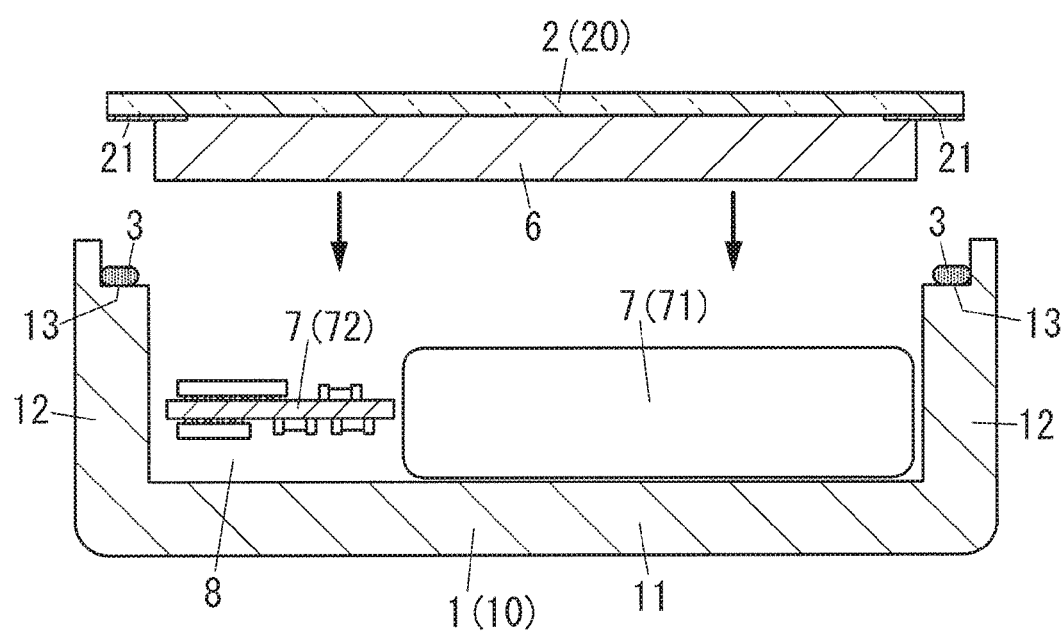
FIG. 5 is a sectional view for illustrating a positioning step in the above-mentioned method.

In the positioning step, the housing 10 and the cover panel 20 are positioned with the uncured adhesive 3 in-between after the irradiating step. In this case, as illustrated in FIG. 5, the cover panel 20 provided with the display unit 6 is brought close to the front surface of the housing 10. Then, the uncured adhesive 3 is interposed between (the surface of) the recessed portion 13 and the decorative printing portion 21.

In the curing step, after the positioning step, the uncured adhesive 3 is fully cured, and the housing 10 and the cover panel 20 are bonded to each other with the cured adhesive 5. The curing of the uncured adhesive 3 in the curing step progresses due to the active energy ray 4 applied by the irradiating step. Therefore, in the curing step, there is substantially no need to further apply the active energy ray 4. In addition, even when the housing 10 or the decorative printing portion 21 does not transmit the active energy ray 4 (e.g., is opaque), the curing of the uncured adhesive 3 advances.

The uncured adhesive 3 to be used in the method for manufacturing the electronic device 100 as described above is the following retarded curing-type adhesive: the adhesive is initiated to cure by irradiation with the active energy ray 4, and maintains a liquid state during the adhesive-placing step and the positioning step, and fully cures in the curing step as a result of the irradiation with the active energy ray 4. The use of this cationically photopolymerizable composition as described above as the retarded curing-type adhesive enables thin-line application (e.g., thin-line application in a width of 0.2 mm to 2.0 mm), secures a desired adhesive strength (e.g., an adhesive strength of 1 MPa or more), and can shorten a tact time (e.g., can shorten the tact time by from several minutes to several hours).

In recent years, portable electronic devices, such as a cellular phone and a smart phone, have become explosively widespread. The display of the smart phone includes an output device for visual representations, and an input device for touch operations. Accordingly, the following tendency is observed: as the screen of the smart phone becomes larger, the amount of information that can be displayed increases and the touch operation becomes easier, and hence a larger screen is preferred.

However, meanwhile, the size of the housing itself of the smart phone also increases along with an increase in size of the screen, and hence the smart phone becomes inconvenient for carrying. Accordingly, frame narrowing in which a frame portion outside the display is narrowed has been trending as a method of increasing the size of only the screen without increasing the size of the housing. Although the frame narrowing has made it possible to increase the size of the screen up to the very dimensions of the housing, an adhesive portion between a cover panel and the housing holding the display has also been narrowing.

A double-sided pressure-sensitive adhesive tape has heretofore been widely used in the adhesion of the cover panel and the housing frame. However, the double-sided pressure-sensitive adhesive tape has involved, for example, a problem in that a sufficient adhesive strength cannot be secured owing to a reduction in adhesive area along with the thinning of an adhesive width, or the thin-line processing of the tape cannot be performed. A reactive hot-melt adhesive has been proposed to cope with those problems, i.e., the insufficient adhesive strength and the inability to perform the thin-line processing (see, for example, JP 5321931 B1).

The reactive hot-melt adhesive is substantially solid at normal temperature, but is liquefied by being heated and hence can be applied with a dispensing robot or the like. At this time, when an application condition is optimized, the adhesive can be applied in the form of a thin line thinner than the thin-line processing limit of the double-sided pressure-sensitive adhesive tape. In addition, a chemical species blended in the adhesive is activated by the heating to react with moisture in air, and hence the adhesive is cured. After a sufficient curing time has been spent, the adhesive becomes a completely insoluble and infusible solid, and hence exhibits an adhesive force much stronger than that of the double-sided pressure-sensitive adhesive tape.

Although the reactive hot-melt adhesive shows those excellent characteristics, the adhesive involves an extremely large number of restrictions in the manufacture of an electronic device. Once the adhesive is heated, the adhesive is activated, and hence its curing reaction advances in an applying device to make it difficult to clean the applying device. Accordingly, once the heating is initiated, the adhesive needs to be used up, and when the adhesive cannot be used up, there is a need to dispose of the adhesive and to use a new adhesive. In addition, a long curing time needs to be secured until the adhesive shows a sufficient strength after its application and adhesion. This is because the chemical reaction of the curing is slow, and in general, the adhesive needs to be cured after having been temporarily fixed with a jig or the like for from several hours to several tens of hours. When the curing time is insufficient, a sufficient adhesive strength is not exhibited, and hence defects, such as defective adhesion and displacement, occur. Accordingly, a tact time (time period required to manufacture one article) becomes extremely long.

Meanwhile, in each of the electronic device and the method for manufacturing the device according to the present embodiment, thin-line application can be performed, a desired adhesive strength is secured, and the tact time can be shortened because the uncured adhesive formed of the cationically photopolymerizable composition as described above is the following retarded curing-type adhesive: the adhesive is initiated to cure by irradiation with the active energy ray, and maintains a liquid state during the adhesive-arranging step and the bonding step, and fully cures in the curing step as a result of the irradiation of the active energy ray.

[Display Device and Method for Manufacturing the Same]

A display device and a method for manufacturing the same including the bonding method are described below. An adhesive to be used in each of the display device and the method for manufacturing the same is preferably a cationically photopolymerizable composition containing the component (A), the component (B), the component (C), and the component (D). The adhesive does not contain the component (E), and hence transparency after curing is easily improved as compared to the case where the adhesive contains the component (E).

Figure 6:
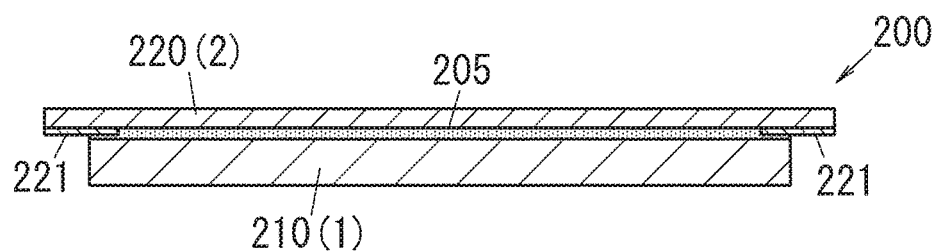
FIG. 6 is a sectional view of a display device according to one embodiment of the present disclosure.

FIG. 6 is an illustration of a display device 200 exemplifying the display device. The display device 200 is a display device, and is assembled by bonding a display panel 210 serving as the first member 1 and a cover panel 220 serving as the second member 2 to each other with a cured adhesive 205. The display device 200 may have a touch panel function enabling the input of information with a finger or the like.

The display panel 210 is configured to display information by use of a character, an image, or the like, and for example, a liquid crystal panel, a plasma display panel, an organic electroluminescence panel (organic EL panel), or an inorganic electroluminescence panel is used.

The cover panel (cover lens) 220 is made of a plastic or glass, and is formed into a rectangular plate shape. The cover panel 220 made of the plastic may be formed of a resin material, such as an acrylic resin, polycarbonate, polyolefin, polymethyl methacrylate (PMMA), or polylactic acid, and may be a composite material obtained by bonding molded plates of these resin materials to each other. In addition, the surface of the cover panel 220 may be covered with a protective coating having weatherability or the like. The cover panel 220 has such transparency that a character, an image, or the like displayed on the display panel 210 can be viewed. The cover panel 220 has a decorative printing portion 221 extending the entire length of the periphery of its rear surface. The decorative printing portion 221 has a light-shielding property, and is used for preventing a portion covered with the decorative printing portion 221 from being viewed through the periphery of the cover panel 220. Therefore, the decorative printing portion 221 makes it difficult to view the cured adhesive 205 and the like. The decorative printing portion 221 is, for example, a printed film (ink film) formed by the screen printing of an acrylic or urethane-based ink. The surface of the cover panel 220 to be bonded to the display panel 210 is preferably formed into a flat surface, The cured adhesive 205 is interposed between the display panel 210 and the cover panel 220 to bond the display panel 210 and the cover panel 220 to each other. The cured adhesive 205 preferably fills in the entire space between the display panel 210 and the cover panel 220 so that a gap or air bubbles may not be present between the display panel 210 and the cover panel 220. The cured adhesive 205 preferably has transparency comparable to that of the cover panel 220. With this, a character, an image, or the like displayed on the display panel 210 can be viewed through the cured adhesive 205 and the cover panel 220. The cured adhesive 205 preferably has a light transmittance of 80% or more, and more preferably has a light transmittance of 90% or more. An upper limit for the light transmittance of the cured adhesive 205 is 100%. In addition, the cured adhesive 205 preferably has a refractive index comparable to that of the cover panel 220. With this, reflection or scattering hardly occurs on an interface between the cured adhesive 205 and the display panel 210, or an interface between the cured adhesive 205 and the cover panel 220.

To manufacture the display device 200 by bonding the display panel 210 and the cover panel 220 to each other, the adhesive-placing step, the irradiating step, the positioning step, and the curing step are sequentially performed.

Figure 7A:
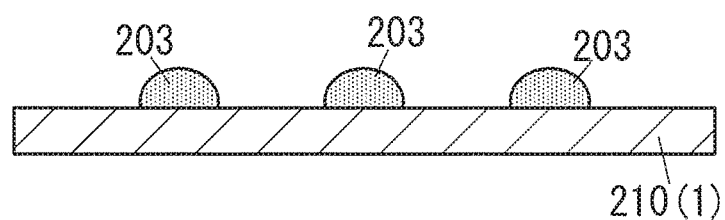
FIG. 7A relates to the display device of one embodiment according to the present disclosure and is a sectional view for illustrating the case where a display panel is subjected to an adhesive-placing step.
Figure 7B:
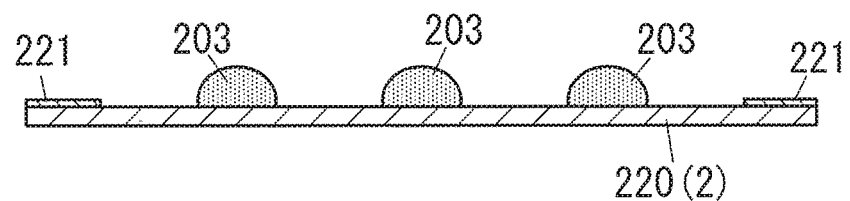
FIG. 7B relates to the display device of the one embodiment according to the present disclosure and is a sectional view for illustrating the case where a cover panel is subjected to an adhesive-placing step.

In the adhesive-placing step, an uncured adhesive 203 is placed on at least one of the display panel 210 and the cover panel 220. Although the uncured adhesive 203 is placed on the surface of the display panel 210 in FIG. 7A. Alternatively, the uncured adhesive 203 may be placed on the surface of the cover panel 220 (including the surface of the decorative printing portion 221) as illustrated in FIG. 7B. Alternatively, the uncured adhesive 203 may be placed on each of both the surface of the display panel 210 and the surface of the cover panel 220. An arbitrary method, such as application or printing, is adopted as means for arranging the uncured adhesive 203. The uncured adhesive 203 is placed of, for example, at mass per area of 30 g/m² to 1,500 g/m². The uncured adhesive 203 may have transparency comparable to that after its curing (that of the cured adhesive 205), or may be semitransparent or opaque.

Figure 8:
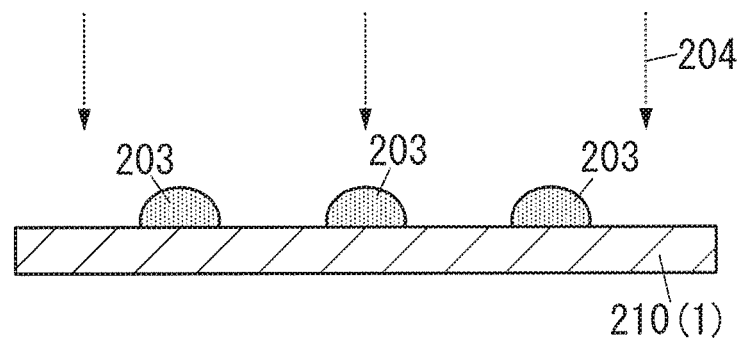
FIG. 8 is a sectional view for illustrating an irradiating step in the above-mentioned manufacturing method for the display device.

In the irradiating step, as indicated by the arrow of FIG. 8, the uncured adhesive 203 placed on the display panel 210 is irradiated with an active energy ray 204 after the adhesive-placing step. When the uncured adhesive 203 is placed on the surface of the cover panel 220, the uncured adhesive 203 is irradiated with the active energy ray 204. The active energy ray 204 is UV light or visible light. The irradiation with the active energy ray 204 initiates the curing of the uncured adhesive 203. In addition, an amount of the active energy ray 204 required for the uncured adhesive 203 to be cured into the cured adhesive 205 is applied by the irradiating step. In the irradiation with the active energy ray 204, for example, a UV lamp is used. The irradiation dose of the active energy ray 204 may be set to, for example, from 50 mJ/cm² to 3,000 mJ/cm².

Figure 9:
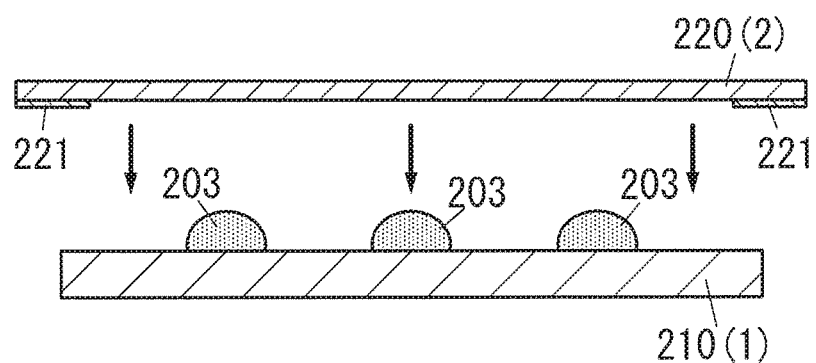
FIG. 9 is a sectional view for illustrating a positioning step in the above-mentioned method.

In the positioning step, the display panel 210 and the cover panel 220 are positioned with the uncured adhesive 203 in-between after the irradiating step. In this case, as illustrated in FIG. 9, the adhesive surfaces of the cover panel 220 and the display panel 210 are brought close to each other. Then, the cover panel 220 and the display panel 210 are stacked so that the uncured adhesive 203 is interposed therebetween.

In the curing step, after the positioning step, the uncured adhesive 203 is fully cured, and the display panel 210 and the cover panel 220 are bonded to each other with the cured adhesive 205. The curing of the uncured adhesive 203 in the curing step progresses due to the active energy ray 204 applied by the irradiating step. Therefore, in the curing step, there is substantially no need to further apply the active energy ray 204. In addition, even when the display panel 210 or the decorative printing portion 221 does not transmit the active energy ray 4 (e.g., is opaque), the curing of the uncured adhesive 203 advances.

The uncured adhesive 203 to be used in the method for manufacturing the display device 200 as described above is the following retarded curing-type adhesive: the adhesive is initiated to cure by irradiation with the active energy ray 204, and maintains a liquid state during the adhesive-arranging step and the bonding step, and fully cures in the curing step as a result of the irradiation with the active energy ray 204, and has transparency after the curing.

The display device according to the present embodiment may be formed as a touch panel. The display device formed as the touch panel has a display function and a touch operation function (position input function). In this case, the device includes a touch sensor in order that the touch operation function may be exhibited.

Figure 10:
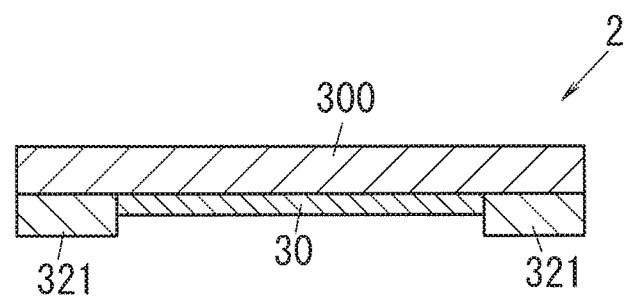
FIG. 10 is a sectional view of a modification of a second member in the above-mentioned method.

FIG. 10 is an illustration of an example of the second member 2 to be used for formation of a display device to be formed as a touch panel. The second member 2 includes a touch sensor 30 and a cover panel 300. In this case, the touch sensor 30 is placed on the rear surface of the cover panel 300 (surface to be bonded to the display panel 210 in FIG. 9) to be inside a decorative printing portion 321. The second member 2 including the touch sensor 30 placed on the cover panel 300 is bonded to the display panel 210 serving as the first member 1 as in FIG. 9. At this time, the uncured adhesive 203 is applied also to the surface of the touch sensor 30, and hence the cover panel 300 is bonded to the display panel 210 also at the position of the touch sensor 30 with the cured adhesive 205.

In addition, the touch sensor may be included in the display panel. In this case, such a structure that the touch sensor is positioned inside the display panel, or such a structure that the touch sensor is positioned on an outer surface of the display panel has been proposed.

Figure 11:
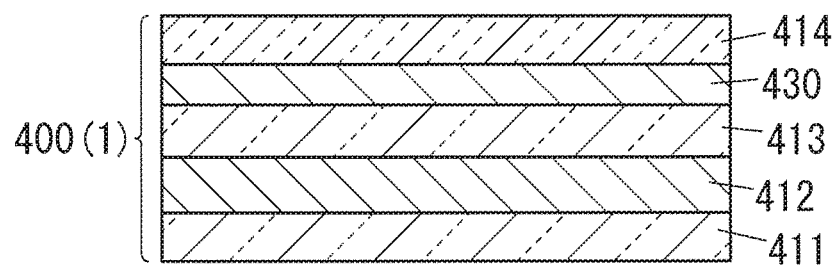
FIG. 11 is a sectional view of a modification of a first member in the above-mentioned method.

In a display panel 400 illustrated in FIG. 11, a glass plate 411 provided with a thin-film transistor (TFT) on its surface, a liquid crystal 412, a glass plate 413 serving as a color filter, a touch sensor 430, and a polarizing plate 414 are stacked in the stated order.

Figure 12:
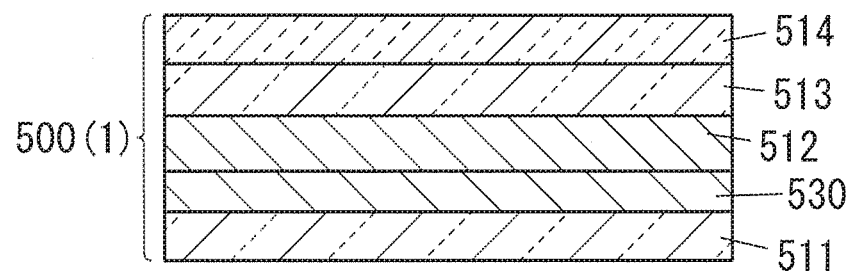
FIG. 12 is a sectional view of another modification of the first member in the above-mentioned method.

In a display panel 500 illustrated in FIG. 12, a glass plate 511 provided with a thin-film transistor (TFT) on its surface, a touch sensor 530, a liquid crystal 512, a glass plate 513 serving as a color filter, and a polarizing plate 514 are stacked in the stated order.

The display panel 400 or 500 as shown in FIG. 11 or FIG. 12 is bonded to the cover panel 220 serving as the second member 2 as in the case of FIG. 9. In this case, however, the uncured adhesive 203 is applied to the surface of the polarizing plate 414 or 514, and the cover panel 220 and the display panel 400 or 500 are bonded to each other with the cured adhesive 205.

A structure illustrated in FIG. 10 has heretofore been used relatively frequently. Recently, however, a structure illustrated in FIG. 11 or FIG. 12 has also started to be used from the viewpoints of downsizing and lightweighting of a display device, and an improvement in fastness thereof.

In recent years, electronic devices mounted with touch panels typified by a smart phone and a portable game machine have become explosively widespread. Many of the touch panels of such electronic devices mounted with the touch panels each achieve both a display function and a touch operation function (position input function) by placing, on the surface of a display panel, a cover panel (cover lens) provided with a touch sensor.

Further, if a gap is present between the display panel and the cover panel, there is a risk in that a reduction in contrast, a reduction in luminance, the reflection of external light, or the like occurs owing to reflected light or scattered light at an interface between the gap and each part to reduce the quality of visual images. In view of the foregoing, in order to avoid the reduction, the quality of the visual images is generally improved by filling the gap between the display panel and the cover panel with a resin having a refractive index close to those of the display panel and the cover panel.

Examples of the resin filling the gap may include an active energy ray-curable transparent adhesive (common name: OCR) and a transparent pressure-sensitive adhesive (common name: OCA). Of those, the transparent pressure-sensitive adhesive can simplify the process, but cannot sufficiently follow a step, such as a bezel portion on the outer periphery of the display panel or a decorative printing portion on the outer periphery of the cover panel, and hence voids (air bubbles) remain in some cases. Accordingly, the number of opportunities to use the active energy ray-curable transparent adhesive has been recently increasing (for example, JP 5134327 B2).

A manufacturing process for a display device with a touch operation function in which the active energy ray-curable transparent adhesive is used includes the step of applying the active energy ray-curable transparent adhesive to the surface of one of the members, i.e., the display panel and the cover panel with a dispensing robot or the like to position the members, followed by the irradiation of the active energy ray-curable transparent adhesive with an active energy ray, such as UV light, through the cover panel to cure the adhesive to bond the members to each other.

Here, as described above, in most cases, a decorative printing portion having a width of about several millimeters is applied to the outer peripheral portion of the cover panel from the viewpoint of a design property. The active energy ray does not sufficiently reach a portion shadowed by the decorative printing portion (hereinafter referred to as "dark portion"), and hence the active energy ray-curable transparent adhesive is uncured in some cases. To solve such problem, in an actual production situation, the step of further irradiating the adhesive with the active energy ray from, for example, the side surface of the cover panel to complete the curing of the dark portion is added, or is performed simultaneously with the irradiation with the active energy ray through the cover panel.

In actuality, however, a defective product is obtained in extremely many cases because the irradiation of the dark portion with the ray from the side surface of the cover panel is not sufficient, and hence the manufacturing process proceeds to the next step while the active energy ray-curable transparent adhesive remains uncured. The above-mentioned technological circumstances and trend are similarly observed in a so-called on-cell type display in which a touch sensor is formed on a display panel, or an in-cell type display in which a touch sensor is formed in a display panel. This is because a cover panel needs to be mounted for protecting an on-cell type/in-cell type display panel from external impact or a flaw.

Meanwhile, in each of the display panel and the method for manufacturing the same according to the present embodiment, the uncured adhesive formed of the cationically photopolymerizable composition as described above is the following retarded curing-type adhesive: the adhesive is initiated to cure by irradiation with the active energy ray, and maintains a liquid state during the adhesive-arranging step and the bonding step, and fully cures in the curing step as a result of the irradiation with the active energy ray, and has transparency after the curing. Accordingly, the irradiating step is performed before the positioning step, and therefore the retarded curing-type adhesive placed on at least one of the display panel and the cover panel in the adhesive-placing step can be sufficiently irradiated with the active energy ray with ease. Hence, insufficient adhesion of the display panel and the cover panel hardly occurs, and the occurrence of a defective product is suppressed.

EXAMPLES

The embodiments of the present disclosure are specifically described below by way of Examples.

Table 1 shows components used in Examples (EX) and Comparative Examples (CE).

TABLE 1

| | Component name | Abbreviation | Chemical component | Product name | Manufacturer |
| --- | --- | --- | --- | --- | --- |
| Component (A) | Polyfunctional epoxy compound (containing polyether backbone) | Component (A1) | Polypropylene glycol-type epoxy resin (polypropylene glycol diglycidyl diether) | PG-207N | Nippon Steel & Sumikin Chemical Co., Ltd. |
| | Polyfunctional epoxy compound (free of polyether backbone) | Component (A2) | Bisphenol A-type epoxy resin | jER828 | Mitsubishi Chemical Corporation |
| Component (B) | Monofunctional epoxy compound (containing polyether backbone) | Component (B1) | Ethylene oxide-based monofunctional epoxy resin (polyethylene glycol monoglycidyl diether) | EX-145 | Nagase ChemteX Corporation |
| | Monofunctional epoxy compound (free of polyether backbone) | Component (B2) | Aliphatic monofunctional epoxy resin | EX-192 | Nagase ChemteX Corporation |
| Component (C) | Photocation generator | Component (C) | Ionic photoacid generation-type photocation generator | SP-170 | ADEKA Corporation |
| Component (D) | Oxetane compound | Component (D1) | DOX-type oxetane resin (3-ethyl-3{[(3-ethyloxetan-3-yl)methoxy]methyl}oxetane | OXT-221 | Toagosei Co., Ltd. |

TABLE 1-continued

| Component name | Abbreviation | Chemical component | Product name | Manufacturer |
|---|---|---|---|---|
| | Component (D2) | 3-Ethyl-3-methacryloxymethyloxetane | ETERNACOLL (trademark) OXMA | Ube Industries, Ltd. |
| | Component (D3) | DOA-type oxetane resin (3-ethyl-3-hydroxymethyloxetane (oxetane alcohol)) | OXT-101 | Toagosei Co., Ltd. |
| | Component (D4) | Biphenyl-type oxetane (4,4'-(3-ethyloxetan-3-ylmethyloxymethyl)biphenyl) | ETERNACOLL (trademark) OXBP | Ube Industries, Ltd. |
| Component (E) Elastomer | Component (E1) | Carboxyl group-containing nitrile-butadiene rubber | XER-32C | JSR Corporation |
| | Component (E2) | Epoxy group-containing silicone elastomer powder | EP-2601 | Dow Corning Toray Co., Ltd. |

[Preparation Method]

A polyfunctional epoxy compound, a monofunctional epoxy compound, a photocation generator, an oxetane compound, and an elastomer were blended at a mass ratio shown in each of Tables 2 to 6 to prepare a blend, and the blend was warmed to 80° C. After that, the blend was dissolved and stirred with a homodisper until the blend has a uniform consistency. Thus, a liquid cationically photopolymerizable composition was obtained.

The following evaluations were performed in relation to the cationically photopolymerizable composition thus obtained.

[Retardation Time]

A retardation time was measured as an index of retarded curability under an atmosphere having a room temperature of 25° C. based on a change in viscosity after irradiation with UV light. A change between the viscosity of each of the cationically photopolymerizable compositions of Examples and Comparative Examples before the irradiation with the UV light, and the viscosity thereof after the irradiation was measured with a UV irradiation-type rheometer (manufactured by Anton Paar Japan K.K., MCR-100). A UV-LED light source (manufactured by Hamamatsu Photonics K.K., LC-L2, center wavelength: 365 nm) was used as a light source for the UV light. The compositions were each irradiated with the UV light at an illuminance of 100 mW/cm$^2$ for 5 seconds, and the total irradiation dose of the light was set to 500 mJ/cm$^2$.

The retardation time was defined as a time period from a time point immediately after the initiation of the irradiation of each of the liquid cationically photopolymerizable compositions with the UV light to a time point when the viscosity of the cationically photopolymerizable composition reached 50,000 Pa·s. This is because the viscosity at which the flowability of the composition is substantially completely lost and hence the bonding of members becomes impossible is about 50,000 Pa·s. When the retardation time is 15 seconds or less, a grace period for the bonding is short, and when the retardation time is 60 minutes or more, a risk of causing the displacement of the members may increase.

[Curing Sharpness]

Curing sharpness was defined as a time period required for the viscosity of each of the liquid cationically photopolymerizable compositions to increase from 2,000 Pa·s to 50,000 Pa·s in the course of the measurement of the retardation time as described above. It is found that as the time period becomes shorter, the viscosity of the cationically photopolymerizable composition increases more abruptly, and hence the degree of sharpness of the curing of the cationically photopolymerizable composition becomes higher.

[Available Time for Positioning]

Available time for positioning was defined as a time period from a time point immediately after the initiation of the irradiation with the UV light to a time point when the viscosity of each of the liquid cationically photopolymerizable compositions reached 2,000 Pa·s in the course of the measurement of the retardation time as described above. It is found that as the time period becomes longer, an increase in viscosity of the liquid cationically photopolymerizable composition becomes more moderate, and hence the working life of the cationically photopolymerizable composition becomes longer.

[Bleeding-out]

After the retardation time had been measured as described above, the surface of a cured product of the cationically photopolymerizable composition after its curing was visually observed, and whether or not an uncured component was present was confirmed. In the case where bleeding-out is present, a state in which the uncured component exudes to the surface of the cured product is established. The case where the bleeding-out was absent was evaluated as "good", and the case where the bleeding-out was present was evaluated as "poor".

[Curability]

After each of the cationically photopolymerizable compositions of Examples and Comparative Examples had been irradiated with UV light at an illuminance of 100 mW/cm$^2$ for 5 seconds by using a UV-LED light source (manufactured by Hamamatsu Photonics K.K., LC-L2, center wavelength: 365 nm), the composition was cured under an atmosphere having a room temperature of 25° C. for 12 hours. After that, whether or not the resultant was cured was confirmed by a touch. The case where the resultant did not easily undergo plastic deformation even when being touched was evaluated as "good", and the case where the resultant easily underwent plastic deformation when being touched was evaluated as "poor".

[Adhesiveness (Adhesive Strength)]

The adhesive strength of each of the cationically photopolymerizable compositions shown in Table 1 was measured by a push-out method. The composition was applied in the shape of a 40-millimeter square frame having a line width of 0.5 mm onto an ABS resin plate A, and was irradiated with UV light at an illuminance of 100 mW/cm$^2$ for 5 seconds by using a UV-LED light source (manufactured by Hamamatsu Photonics K.K., LC-L2, center wavelength: 365 nm). Immediately after that, an ABS resin plate B perforated with a hole having a diameter of 20 mm at its center was bonded to the resultant, and the whole was cured under an atmosphere having a room temperature of 25° C. for 12 hours to produce a test piece. The measuring portion of a push-pull gauge was pressed against the ABS resin plate A through the hole of the ABS resin plate B. A force in a vertical direction was applied to the ABS resin plate A, and the maximum stress required to peel the plate was measured and defined as the adhesive strength. A testing speed was set to 10 mm/sec.

The required adhesive strength varies depending on applications. Here, however, an acceptance criterion was set to 40 N (1.0 MPa) or more, and an adhesive strength of 60 N or more was represented as "excellent", an adhesive strength of 40 N or more and less than 60 N was represented as "good", and an adhesive strength of less than 40 N was represented as "poor".

A [strength of cured product], an [elastic modulus], and an [elongation ration] were measured in conformity with JIS K 7161.

TABLE 2

|  |  |  | EX 1 | EX 2 | EX 3 | EX 4 | EX 5 | EX 6 |
|---|---|---|---|---|---|---|---|---|
| Blending amount (part(s) by mass) | Polyfunctional epoxy compound (containing polyether backbone) | Component (A1) | 90 | 50 | 30 | 90 | 50 | 30 |
|  | Polyfunctional epoxy compound (free of polyether backbone) | Component (A2) | — | — | — | — | — | — |
|  | Monofunctional epoxy compound (containing polyether backbone) | Component (B1) | 10 | 50 | 70 | — | — | — |
|  | Monofunctional epoxy compound (free of polyether backbone) | Component (B2) | — | — | — | 10 | 50 | 70 |
|  | Photocation generator | Component (C) | 2 | 2 | 2 | 2 | 2 | 2 |
|  | Oxetane compound | Component (D1) | 10 | 10 | 10 | 10 | 10 | 10 |
| Evaluations | Retardation time (required to reach 50,000 Pa · s) |  | 60 min | 65 min | 70 min | 36 min | 13 min | 8 min |
|  | Curing sharpness (2,000 Pa · s to 50,000 Pa · s) |  | 30 min | 30 min | 30 min | 16 min | 8 min | 5 min |
|  | Available time for positioning (required to reach 2,000 Pa · s) |  | 30 min | 35 min | 40 min | 20 min | 5 min | 3 min |
|  | Bleeding-out |  | good | good | good | good | good | good |
|  | Adhesiveness |  | good | good | good | good | good | good |

TABLE 3

|  |  |  | EX 7 | EX 8 | EX 9 | EX 10 | CE 1 | CE 2 | CE 3 | CE 4 |
|---|---|---|---|---|---|---|---|---|---|---|
| Blending amount (part(s) by mass) | Polyfunctional epoxy compound (containing polyether backbone) | Component (A1) | — | — | — | 25 | — | 50 | 25 | — |
|  | Polyfunctional epoxy compound (free of polyether backbone) | Component (A2) | 90 | 50 | 30 | 25 | 50 | — | 25 | 45 |
|  | Monofunctional epoxy compound (containing polyether backbone) | Component (B1) | 10 | 50 | 70 | 25 | 50 | — | 25 | — |
|  | Monofunctional epoxy compound (free of polyether backbone) | Component (B2) | — | — | — | 25 | — | 50 | 25 | 55 |
|  | Photocation generator | Component (C) | 2 | 2 | 2 | 2 | 2 | 2 | 2 | 2 |
|  | Oxetane compound | Component (D1) | 10 | 10 | 10 | 10 | — | — | — | 10 |
| Evaluations | Retardation time (required to reach 50,000 Pa · s) |  | 5 min | 12 min | 40 min | 12 min | 50 min | 52 min | 50 min | 3 min |
|  | Curing sharpness (2,000 Pa · s to 50,000 Pa · s) |  | 3 min | 6 min | 20 min | 7 min | 33 min | 37 min | 35 min | 3 min |
|  | Available time for positioning (required to reach 2,000 Pa · s) |  | 2 min | 6 min | 20 min | 5 min | 17 min | 15 min | 15 min | 10 sec |
|  | Bleeding-out |  | good | good | good | good | good | good | good | good |
|  | Adhesiveness |  | good | good | good | good | good | good | good | good |

TABLE 4

|  |  |  | CE 1 | EX 11 | EX 12 | EX 8 | EX 13 | EX 14 |
|---|---|---|---|---|---|---|---|---|
| Blending amount (part(s) by mass) | Polyfunctional epoxy compound (containing polyether backbone) | Component (A1) | — | — | — | — | — | — |
|  | Polyfunctional epoxy compound (free of polyether backbone) | Component (A2) | 50 | 50 | 50 | 50 | 50 | 50 |
|  | Monofunctional epoxy compound (containing polyether backbone) | Component (B1) | 50 | 50 | 50 | 50 | 50 | 50 |
|  | Monofunctional epoxy compound (free of polyether backbone) | Component (B2) | — | — | — | — | — | — |
|  | Photocation generator | Component (C) | 2 | 2 | 2 | 2 | 2 | 2 |
|  | Oxetane compound | Component (D1) | — | 0.1 | 1 | 10 | 30 | 35 |
| Evaluations | Retardation time (required to reach 50,000 Pa · s) |  | 50 min | 46 min | 36 min | 12 min | 1 min | 30 sec |
|  | Curing sharpness (2,000 Pa · s to 50,000 Pa · s) |  | 33 min | 29 min | 22 min | 6 min | 44 sec | 20 sec |
|  | Available time for positioning (required to reach 2,000 Pa · s) |  | 17 min | 17 min | 14 min | 6 min | 16 sec | 10 sec |
|  | Bleeding-out |  | good | good | good | good | good | good |
|  | Adhesiveness |  | good | good | good | good | good | good |

TABLE 5

| | | | EX 8 | EX 15 | EX 16 | EX 17 | EX 18 |
|---|---|---|---|---|---|---|---|
| Blending amount (part(s) by mass) | Polyfunctional epoxy compound (containing polyether backbone) | Component (A1) | — | — | — | — | — |
| | Polyfunctional epoxy compound (free of polyether backbone) | Component (A2) | 50 | 50 | 50 | 50 | 50 |
| | Monofunctional epoxy compound (containing polyether backbone) | Component (B1) | 50 | 50 | 50 | 50 | 50 |
| | Monofunctional epoxy compound (free of polyether backbone) | Component (B2) | — | — | — | — | — |
| | Photocation generator | Component (C) | 2 | 2 | 2 | 2 | 2 |
| | Oxetane compound | Component (D1) | 10 | — | — | — | 5 |
| | | Component (D2) | — | 10 | — | — | — |
| | | Component (D3) | — | — | 10 | — | 5 |
| | | Component (D4) | — | — | — | 10 | — |
| Evaluations | Retardation time (required to reach 50,000 Pa · s) | | 12 min | 13 min | 13 min | 15 min | 12.5 min |
| | Curing sharpness (2,000 Pa · s to 50,000 Pa · s) | | 6 min | 7 min | 7 min | 8 min | 6.5 min |
| | Available time for positioning (required to reach 2,000 Pa · s) | | 6 min | 6 min | 6 min | 7 min | 6 min |
| | Bleeding-out | | good | good | good | good | good |
| | Adhesiveness | | good | good | good | good | good |

TABLE 6

| | | | EX 5 | EX 19 | EX 20 | EX 21 | EX 22 | EX 23 |
|---|---|---|---|---|---|---|---|---|
| Blending amount (part(s) by mass) | Polyfunctional epoxy compound (containing polyether backbone) | Component (A1) | 50 | 50 | 50 | 50 | 50 | 50 |
| | Polyfunctional epoxy compound (free of polyether backbone) | Component (A2) | — | — | — | — | — | — |
| | Monofunctional epoxy compound (containing polyether backbone) | Component (B1) | — | — | — | — | — | — |
| | Monofunctional epoxy compound (free of polyether backbone) | Component (B2) | 50 | 50 | 50 | 50 | 50 | 50 |
| | Photocation generator | Component (C) | 2 | 2 | 2 | 2 | 2 | 2 |
| | Oxetane compound | Component (D1) | 10 | 10 | 10 | 10 | 10 | 10 |
| | Elastomer | Component (E1) | — | — | 12.5 | 50 | 25 | — |
| | | Component (E2) | — | 0.1 | 12.5 | 0 | — | 25 |
| Evaluations | Retardation time (required to reach 50,000 Pa · s) | | 13 min | 13 min | 33 min | 59 min | 45 min | 13 min |
| | Curing sharpness (2,000 Pa · s to 50,000 Pa · s) | | 8 min | 8 min | 14 min | 31 min | 41 min | 8 min |
| | Available time for positioning (required to reach 2,000 Pa · s) | | 5 min | 5 min | 19 min | 28 min | 14 min | 5 min |
| | Bleeding-out | | good | good | good | good | good | good |
| | Strength of cured product (Pa) | | 0.3M | 0.32M | 0.5M | 0.6M | 0.5M | 0.5M |
| | Elastic modulus (Pa) | | 1.5M | 1.3M | 1M | 0.8M | 1M | 1M |
| | Elongation ratio | | 40% | 45% | 70% | 100% | 70% | 70% |
| | Adhesiveness | | good | excellent | excellent | excellent | excellent | excellent |

As shown in Table 2 and Table 3, in each of Examples 1 to 10, while the available time for positioning was sufficiently secured, the bleeding-out did not occur and the adhesiveness was excellent.

Figure 13A:
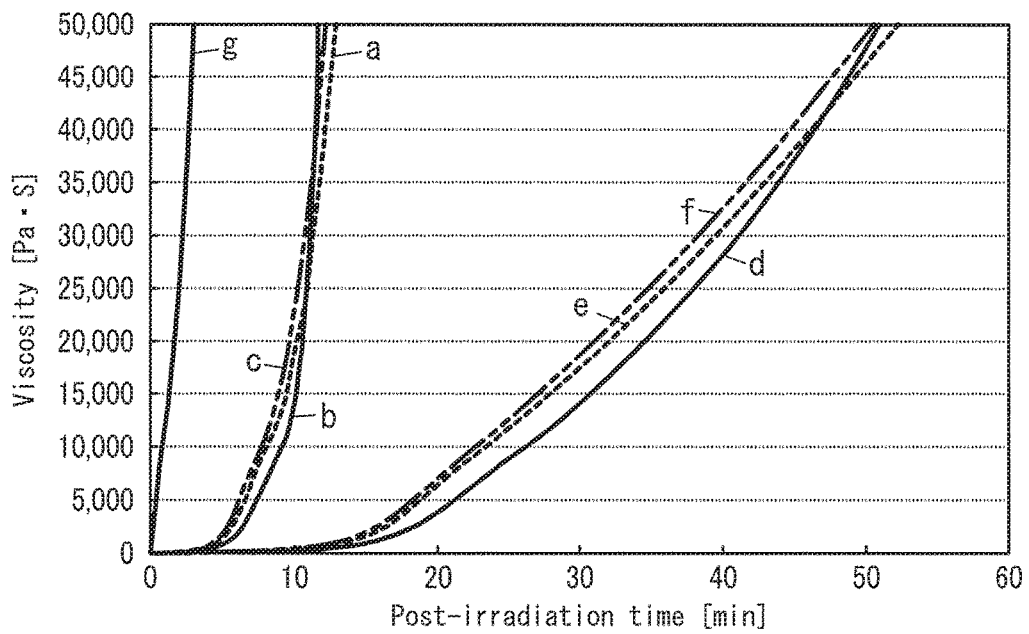
FIG. 13A is a graph for showing a change in the viscosity with the post-irradiation time up to 50,000 Pa·s for Examples 5, 8, and 10, and Comparative Examples 1 to 4.
Figure 13B:
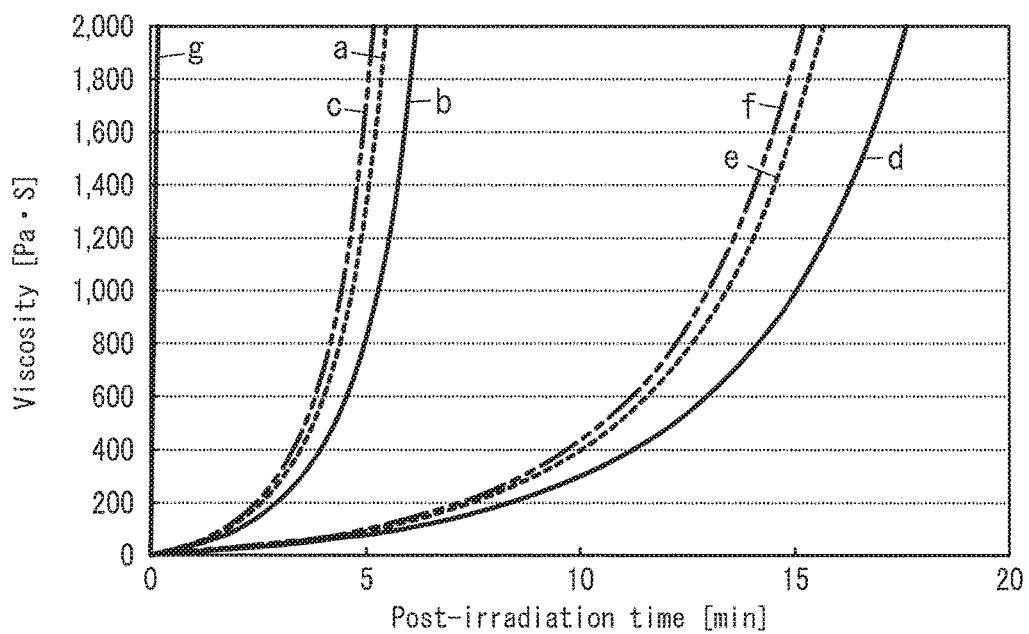
FIG. 13B is a graph for showing a change in the viscosity with the post-irradiation time up to 2,000 Pa·s for Examples 5, 8, and 10, and Comparative Examples 1 to 4.

FIG. 13A and FIG. 13B are each a graph for showing a change in the viscosity with the post-irradiation time for Example 5, Example 8, and Example 10, and Comparative Examples 1 to 4. Example 5 is shown by a curve a, Example 8 is shown by a curve b, Example 10 is shown by a curve c, Comparative Example 1 is shown by a curve d, Comparative Example 2 is shown by a curve e, Comparative Example 3 is shown by a curve f, and Comparative Example 4 is shown by a curve g.

As is apparent from FIG. 13A, in each of Examples 5, 8, and 10, a time period required for a viscosity to reach 50,000 Pa·s is shorter than those in Comparative Examples 1 to 3, and the time period required for the viscosity to reach 50,000 Pa·s is longer than that in Comparative Example 4. Therefore, in each of Examples 5, 8, and 10, the curing step becomes shorter than those in Comparative Examples 1 to 3.

Meanwhile, as is apparent from FIG. 13B, in each of Examples 5, 8, and 10, a time period required for the viscosity to reach 2,000 Pa·s is shorter than those in Comparative Examples 1 to 3, but the time period required for the viscosity to reach 2,000 Pa·s is longer than that in Comparative Example 4. Therefore, in each of Examples 5, 8, and 10, the available time for positioning can be sufficiently secured as compared to Comparative Example 4.

In addition, as is apparent from Table 4 and Table 5, even when the blending amount and kind of the oxetane compound were changed within predetermined ranges, while the available time for positioning was sufficiently secured, the bleeding-out did not occur and the adhesiveness was excellent.

Further, as is apparent from Table 6, in each of Examples 19 to 23 each containing an elastomer, the strength of the cured product, the elongation ratio, and the adhesiveness were improved as compared to Example 5 free of any elastomer. Also in each of the cationically photopolymerizable compositions obtained by blending Examples 1 to 4 and Examples 6 to 10 with elastomers, as in the case of each of Examples 19 to 23 (cationically photopolymerizable compositions obtained by blending Example 5 with elastomers), it was confirmed that the strength of the cured product, the elongation ratio, and the adhesiveness were improved.

(Example and Comparative Examples Each Concerning Electronic Device)

A cationically photopolymerizable composition R1 was used as a retarded curing-type adhesive that maintained a liquid state immediately after irradiation with an active energy ray and fully cured after a lapse of a certain time period. The cationically photopolymerizable composition RI has a viscosity before the irradiation with the active energy ray of 50 Pa·s and a thixotropic index of 4.0. The composition is activated by irradiation with UV light from a LED-type UV light source having a center wavelength of 365 nm (LC-L5 available from Hamamatsu Photonics K.K.) at 100 mJ/cm$^2$, and the composition maintains a viscosity of 300 Pa·s or less for 5 minutes or less after the initiation of the irradiation, and fully cures 30 minutes thereafter to show a shear adhesive strength of 1 MPa or more.

The cationically photopolymerizable composition R1 includes: 50 parts by mass of a polypropylene glycol-type epoxy resin PG-207N (trade name) (available from Nippon Steel & Sumikin Chemical Co., Ltd.) serving as a polyether backbone-containing polyfunctional epoxy resin; 50 parts by mass of an aliphatic monofunctional epoxy resin EX-192 (trade name) (available from Nagase ChemteX Corporation); 2 parts by mass of an aromatic sulfonium salt-based photocation generator SP-170 (trade name) (available from ADEKA Corporation); 10 parts by mass of a DOX-type oxetane resin OXT-221 (trade name) (available from Toagosei Co., Ltd.); 12.5 parts by mass of a carboxyl group-containing nitrile-butadiene rubber XER-32C (trade name) (available from JSR Corporation); and 12.5 parts by mass of epoxy group-containing silicone elastomer powder EP-2601 (trade name) (available from Dow Corning Toray Co., Ltd.).

PUR-200A available from DIC Corporation was used as a reactive hot-melt adhesive. PUR-200A is solid at normal temperature, but is liquefied by being heated to 110° C. and hence can be applied with an applying device. In addition, a reactive component is activated by the heating to 110° C. and reacts with a trace amount of moisture in air, and hence the adhesive is cured in several hours. The adhesive is not melted again by heating and shows a shear adhesive strength of 1 MPa or more.

No. 571158 available from Nitto Denko Corporation was used as a double-sided pressure-sensitive adhesive tape. No. 57115B is a double-sided pressure-sensitive adhesive tape having acrylic pressure-sensitive adhesive layers formed on both surfaces of a polyolefin-based foam film, and has been widely used for assembling a cellular phone.

A dispensing robot (SM-200DS available from Musashi Engineering, Inc.) and a pulse air-type dispenser (ML-5000X2 available from Musashi Engineering, Inc.) were used in combination as the applying device.

As a method of confirming adhesion, members were bonded to each other and then left at rest for a time period defined for each adhesive. After that, a force of 100 N was applied as a force for peeling a housing frame and a cover panel from each other in a direction perpendicular to their adhesive surface, and it was confirmed that the frame and the cover panel did not peel from each other.

As a method of identifying a working life, after the initial application, while the adhesive was set in the applying device under the same conditions, whether or not the adhesive could be similarly applied again 8 hours and 24 hours after the initial application was confirmed.

In addition, the measuring portion of a push-pull gauge was pressed against the cover panel through a hole of the housing. A force in a vertical direction was applied to the cover panel, and the maximum stress required to peel the panel was measured and defined as an adhesive strength. A testing speed was set to 10 mm/sec. The required adhesive strength varies depending on applications. Here, however, an acceptance criterion was set to 1.0 MPa, and an adhesive strength of 1.0 MPa or more was represented as "good", and an adhesive strength of less than 1.0 MPa was represented as "poor".

In addition, a time point when the housing and the cover panel were positioned with adhesive in-between was defined as an initial stage, and a time period required for the adhesive to exhibit an adhesive strength of 1.0 MPa or more was defined as a tact time.

Example 24

An adhesive-placing step, an irradiating step, a positioning step, and a curing step were sequentially performed, wherein the cationically photopolymerizable composition R1 was used as an uncured adhesive. The cationically photopolymerizable composition R1 was applied onto a housing with the applying device. At this time, the composition was applied so as to have a width of 0.4 mm by adjusting a discharged air pressure and an application rate.

The entirety of the applied adhesive was irradiated with light serving as an active energy ray. At this time, LC-L5 available from Hamamatsu Photonics K.K. (linear UV-LED light source having a center wavelength of 365 nm) was used as a light source for the UV light, and the irradiation dose of the light was set to 100 mW/cm$^2$×1 second=100 mJ/cm$^2$.

A cover panel was positioned relative to the housing within 1 minute after the irradiation with the UV light. After the positioning, the adhesive was left at rest for 30 minutes to fully cure, and it was confirmed that the housing and the cover panel are bonded to each other.

In addition, the adhesive was left to stand for 8 hours and 24 hours while being set in the applying device. After that, the adhesive was applied again under the same conditions. As a result, the adhesive was able to he applied in the same manner as in the initial stage.

Comparative Example 5

A housing and a cover panel were bonded to each other with PUR-200A.

PUR-200A was applied onto the housing with the applying device. At this time, the adhesive was heated to 110° C. to be liquefied, and was applied so as to have a width of 0.4 mm by adjusting a discharged air pressure and an application rate. The cover panel was positioned relative to the housing within 1 minute after the application. After the positioning, the adhesive was left at rest for 6 hours to be cured, and it was confirmed that the housing and the cover panel were bonded to each other.

In addition, the adhesive was left to stand for 8 hours while being set in the applying device. After that, an attempt was made to similarly apply the adhesive again. However, the adhesive had already been cured and hence could not be applied. This is assumed to be because a reactive component activated by the heating to 110° C. reacted with moisture in air that had entered from, for example, a gap of the device or moisture remaining in a resin to advance the curing reaction.

Comparative Example 6

Various investigations were made to process the double-sided pressure-sensitive adhesive tape into a width of 0.4 mm with, for example, a shear-type micro-slit device, a gang-type micro-slit device, or a rotary die cut device. However, the tape could not be cut into a width of 0.4 mm while its shape was maintained.

The results of the evaluations are shown in Table 7. In the retarded curing-type adhesive of this example, the following results were able to be obtained: the adhesive showed a sufficient adhesive strength in thin-line adhesion in a width of 0.4 mm, and had a short tact time and a long pot life. Accordingly, the shortening of a production process for an electronic device and a reduction in in-process inventory or the like are achieved, and the housing and the cover panel can be bonded to each other with a small application amount of the retarded curing-type adhesive without exchanging the adhesive, and an epoxy resin and the like to be used in the adhesive for a long time period, and hence a reduction in production cost can be achieved.

wherein the cationically photopolymerizable composition R2 was used as an uncured adhesive.

The cationically photopolymerizable composition R2 was applied to the entirety of the surface of a display panel (that was a liquid crystal panel and had a touch sensor built therein) with the applying device. At this time, the composition was applied in an application amount of 100 g/m$^2$ by adjusting a discharged air pressure and an application rate.

The entirety of the applied adhesive was irradiated with UV light serving as an active energy ray. At this time, LC-L5 available from Hamamatsu Photonics K.K. (linear UV-LED light source having a center wavelength of 365 nm) was used as a light source for the UV light, and the irradiation dose of the light was set to 100 mW/cm$^2$×1 second=100 mJ/cm$^2$.

A cover panel was positioned relative to the display panel within 30 seconds after the irradiation with the UV light. A transparent plate made of chemically strengthened glass and

TABLE 7

|  | EX 24 | CE 5 | CE 6 |
|---|---|---|---|
| Kind of adhesive | Retarded curing-type adhesive | Reactive hot-melt adhesive | Double-sided pressure-sensitive adhesive tape |
| Product number of adhesive | — | PUR-200A | No. 57115B |
| Supply in a width of 0.4 mm | good | good | poor (unable to be processed) |
| Whether or not housing and cover panel can be fixed to each other | good | good | — |
| Pot life | 24 hours or more | 8 hours or less | — |
| Adhesive strength | good | good | — |
| Tact time | 30 min | 6 hours | — |

(Examples and Comparative Examples Each Concerning Display Panel)

A cationically photopolymerizable composition R2 was used as a retarded curing-type adhesive that maintained a liquid state immediately after irradiation with an active energy ray and fully cured after a lapse of a certain time period. The cationically photopolymerizable composition R2 has a viscosity before the irradiation with the active energy ray of 1.0 Pa·s. The composition is activated by irradiation with UV light from a LED-type UV light source having a center wavelength of 365 nm (LC-L5 available from Hamamatsu Photonics K.K.) at 100 mJ/cm$^2$, and the composition maintains a viscosity of 20 Pa·s or less for 5 minutes or less after the initiation of the irradiation, and is cured 30 minutes thereafter to show a shear adhesive strength of 0.5 MPa or more. In addition, after the curing, the composition has a total light transmittance of 99% or more, is colorless and transparent, and has a refractive index nD of 1.5, and hence the composition has characteristics that are by no means inferior to those of a general OCR.

The cationically photopolymerizable composition R2 includes: 90 parts by mass of a bisphenol A-type difunctional epoxy resin jER828 (trade name) (available from Mitsubishi Chemical Corporation); 10 parts by mass of a polyether backbone-containing monofunctional epoxy resin EX-145 (trade name) (available from Nagase ChemteX Corporation); 2 parts by mass of an aromatic sulfonium salt-based photocation generator SP-170 (trade name) (available from ADEKA Corporation); and 10 parts by mass of a DOX-type oxetane resin OXT-221 (trade name) (available from Toagosei Co., Ltd.).

A dispensing robot (SM-200DS available from Musashi Engineering, Inc.) was used as an applying device.

Example 25

An adhesive-placing step, an irradiating step, a positioning step, and a curing step were sequentially performed, having a thickness of 0.5 mm was used as the cover panel. A decorative printing portion having a width of 5 mm is formed over the entire periphery of an outer peripheral end portion on the rear surface of the cover panel. After the positioning, the uncured adhesive was left at rest for 30 minutes to be cured. The display panel and the cover panel were bonded to each other with the cured adhesive to form a display device.

With regard to the display device, the display panel and the cover panel were peeled from each other in an adhesive portion (portion of the cured adhesive), and the cured adhesive was observed. As a result, it was confirmed that an uncured portion was absent. That is, even in a dark portion between the decorative printing portion and the display panel, the adhesive was sufficiently cured to bond the surface of the decorative printing portion and the surface of the display panel to each other.

Example 26

The uncured adhesive was applied to the cover panel instead of the application of the uncured adhesive to the display panel. A display device was formed in the same manner as in Example 25 except the foregoing.

With regard to the display device, the display panel and the cover panel were peeled from each other in an adhesive portion (portion of the cured adhesive), and the cured adhesive was observed. As a result, as in Example 25, it was confirmed that an uncured portion was absent.

Comparative Example 7

An adhesive-placing step, a positioning step, an irradiating step, and a curing step were sequentially performed, wherein SVR1120 available from Dexerials Corporation was used as a general active energy ray-curable transparent adhesive. Here, in the irradiating step, an irradiation dose was set to 100 mW/cm$^2$×50 seconds=5,000 mJ/cm$^2$ serving as a curing condition recommended for the adhesive. After having been irradiated with UV light, the adhesive was left at rest for 24 hours. A display device was formed in the same manner as in Example 25 except the foregoing.

With regard to the display device, the display panel and the cover panel were peeled from each other in an adhesive portion (portion of the cured adhesive), and the cured adhesive was observed. As a result, it was confirmed that an uncured portion of the cured adhesive was present below the decorative printing portion.

Comparative Example 8

An adhesive-placing step, an irradiating step, a positioning step, and a curing step were sequentially performed in the same manner as in Example 25, wherein the same active energy ray-curable transparent adhesive is used as that of Comparative Example 7. At this time, a light source for, and the irradiation dose of, UV light were the same as those of Example 25.

An attempt was made to position the display panel and the cover panel within 30 seconds after the irradiation with the UV light. However, the positioning could not be performed because the curing of the adhesive advanced and hence the adhesive gelled.

The results of the evaluations are shown in Table 8.

In the cationically photopolymerizable composition according to the second aspect, which would be realized in combination with the first aspect, a proportion of a mass of the component (D) to a total mass of the component (A) and the component (B) may preferably fall within a range of 0.01% to 30%.

In this aspect, the cationically photopolymerizable composition shows curing sharpness while securing the working life, and hence a tact time can be shortened.

The cationically photopolymerizable composition according to the third aspect, which would be realized in combination with the first or second aspect, may preferably have properties of maintaining a liquid state for 5 seconds or more and 60 minutes or less after irradiation with an active energy ray at an irradiation dose of 50 mJ/cm$^2$ or more, and thereafter curing within 12 hours from the irradiation.

In this aspect, while the cationically photopolymerizable composition sufficiently secures the working life, a curing time at the time of the curing of the composition can be prevented from lengthening, and hence the tact time can be shortened.

The cationically photopolymerizable composition according to the fourth aspect, which would be realized in combination with any one of the first to third aspects, may preferably further include (E) an elastomer.

In this aspect, a cured product of the cationically photopolymerizable composition causes changes in physical characteristics, such as an improvement in strength, a reduction in elastic modulus, and an improvement in elongation ratio.

TABLE 8

|  | EX 25 | EX 26 | CE 7 | CE 8 |
|---|---|---|---|---|
| Uncured adhesive | UV retarded curing-type transparent adhesive | UV retarded curing-type transparent adhesive | General UV-curable transparent adhesive | General UV-curable transparent adhesive |
| Member to which adhesive is applied | Display panel | Cover panel | Display panel | Display panel |
| Process | Application ↓ UV irradiation ↓ Positioning | Application ↓ UV irradiation ↓ Positioning | Application ↓ Positioning ↓ UV irradiation | Application ↓ UV irradiation ↓ Positioning |
| Whether or not positioning is possible | Possible | Possible | Possible | Impossible |
| Presence or absence of uncured adhesive | Absence | Absence | Presence | — |

As is apparent from this embodiment described above, the cationically photopolymerizable composition according to the first aspect includes: (A) a polyfunctional epoxy compound having two or more epoxy groups per molecule; (B) a monofunctional epoxy compound having one epoxy group per molecule; (C) a photocation generator; and (D) an oxetane compound. At least one of the component (A) and the component (B) contains an epoxy compound ((A1) or (B1)) having a polyether backbone per molecule. A mass ratio of the component (A) to the component (B) falls within a range of 90:10 to 30:70.

In this aspect, the cationically photopolymerizable composition can sufficiently secure a working life because the composition contains at least one of the polyfunctional epoxy compound (A1) and the monofunctional epoxy compound (B1). In addition, the cationically photopolymerizable composition can shorten curing completion time required after a lapse of the working life because the composition contains the oxetane compound. Moreover, the cationically photopolymerizable composition can suppress the occurrence of bleeding-out after its curing because the polyether backbone is present in a molecule of the epoxy compound.

In particular, the cured product is expected to be also improved in resistance to impact or the like by the improvement in elongation ratio. In addition, changes in chemical characteristics, such as the strengthening of a chemical interaction with an adherend by a polar group in the elastomer, and the formation of a chemical bond with the adherend by a cationically polymerizable substituent in the elastomer, occur, and hence adhesiveness between the cured product of the cationically photopolymerizable composition and the adherend is easily improved, The bonding method according to the fifth aspect, includes an adhesive-placing step of placing an uncured adhesive (3) which is the cationically photopolymerizable composition of any one of the first to fourth aspects, on at least one of a first member (1) and a second member (2). The bonding method includes an irradiating step of irradiating the uncured adhesive (3) with an active energy ray (4) after the adhesive-placing step. The bonding method includes a positioning step of positioning the first member (1) and the second member (2) with the uncured adhesive (3) in-between after the irradiating step. The bonding method includes a curing step of bonding the first member and the second member to each other by curing the uncured adhesive (3) after the positioning step. The uncured adhesive (3) is initiated to cure by irradiation with the active energy ray (4), and maintains a liquid state during the adhesive-placing step and the positioning step. The uncured adhesive (3) fully cures in the curing step as a result of the irradiation with the active energy ray (4).

In this aspect, the working life of the uncured adhesive (3) can be sufficiently secured because one, or each of both, of the component (A) and the component (B) in the uncured adhesive (3) contains an epoxy compound having a polyether backbone per molecule. In addition, the uncured adhesive (3) can shorten curing completion time required after a lapse of the working life because the adhesive contains the oxetane compound. Moreover, the uncured adhesive (3) can suppress the occurrence of bleeding-out after its curing because the polyether backbone is present in a molecule of the epoxy compound.

The method for manufacturing an electronic device (100) according to the sixth aspect includes the bonding method of the fifth aspect. The first member (1) includes a housing (10). The second member (2) includes a cover panel (20).

In this aspect, in the method for manufacturing the electronic device (100), the thin-line application of the uncured adhesive (3) can be performed at the time of the adhesion of the housing (10) and the cover panel (20), a desired adhesive strength is secured by a cured product of the adhesive (3) (cured adhesive (5)), and a tact time can be shortened.

The method for manufacturing a display device (200) according to the seventh aspect includes the bonding method of the fifth aspect. The first member (1) includes a display panel (210). The second member (2) includes a cover panel (220).

In this aspect, in the method for manufacturing the display device (200), an adhesive strength between the display panel (210) and the cover panel (220) is secured by a cured product of the cationically photopolymerizable composition (cured adhesive (5)), and a tact time can be shortened.

The electronic device (100) according to the eighth aspect includes: a cured product of the cationically photopolymerizable composition of any one of the first to fourth aspects; a housing (10); and a cover panel (20). The housing (10) and the cover panel (20) are bonded to each other with the cured product.

In this aspect, in the electronic device (100), the housing (10) and the cover panel (20) are bonded to each other at a desired adhesive strength with the cured product of the cationically photopolymerizable composition (cured adhesive (5)).

The display device (200) according to the ninth aspect includes: a cured product of the cationically photopolymerizable composition of any one of the first to fourth aspects; a display panel (210); and a cover panel (220). The display panel (210) and the cover panel (220) are bonded to each other with the cured product.

In this aspect, in the display device (200), the display panel (210) and the cover panel (220) are bonded to each other at a desired adhesive strength with the cured product of the cationically photopolymerizable composition (cured adhesive (5)).

The invention claimed is:

1. A cationically photopolymerizable composition comprising:
   (A) a polyfunctional epoxy compound having two or more epoxy groups per molecule;
   (B) a monofunctional epoxy compound having one epoxy group per molecule;
   (C) a photocation generator that absorbs an active energy ray; and
   (D) an oxetane compound,
   at least one of the component (A) and the component (B) containing an epoxy compound having a linear polyether skeleton per molecule;
   a mass ratio of the component (A) to the component (B) falling within a range of 90:10 to 30:70,
   a proportion of a mass of the component (D) to a total mass of the component (A) and the component (B) falling within a range of 0.01% to 30%, and
   the polyether skeleton being the following chemical structural formula (1):

$$\mathrm{\text{\textendash}(RO\text{\textendash})}_m \quad (1)$$

wherein R represents a divalent hydrocarbon group, and m represents an integer being greater than or equal to 2.

2. The cationically photopolymerizable composition of claim 1 having properties of maintaining a liquid state for 5 seconds or more and 60 minutes or less after irradiation with an active energy ray at an irradiation dose of 50 mJ/cm$^2$ or more, and thereafter curing within 12 hours from the irradiation.

3. The cationically photopolymerizable composition of claim 1, further comprising (E) an elastomer.

4. A bonding method comprising:
   an adhesive-placing step of placing an uncured adhesive which is the cationically photopolymerizable composition of claim 1, on at least one of a first member and a second member;
   an irradiating step of irradiating the uncured adhesive with an active energy ray after the adhesive-placing step;
   a positioning step of positioning the first member and the second member with the uncured adhesive in-between after the irradiating step; and
   a curing step of bonding the first member and the second member to each other by curing the uncured adhesive after the positioning step,
   the uncured adhesive being initiated to cure by irradiation with the active energy ray, and maintaining a liquid state during the adhesive-placing step and the positioning step, and fully curing in the curing step as a result of the irradiation with the active energy ray.

5. A method for manufacturing electronic device, the method comprising the bonding method of claim 4,
   the first member comprising a housing, and
   the second member comprising a cover panel.

6. A method for manufacturing display device, the method comprising the bonding method of claim 4,
   the first member comprising a display panel, and
   the second member comprising a cover panel.

7. An electronic device, comprising:
   a cured product of the cationically photopolymerizable composition of claim 1;
   a housing; and
   a cover panel,
   the housing and the cover panel being bonded to each other with the cured product.

8. A display device, comprising:
a cured product of the cationically photopolymerizable composition of claim 1;
a display panel; and
a cover panel,
the display panel and the cover panel being bonded to each other with the cured product.

9. The cationically photopolymerizable composition of claim 3, wherein the component (E) has a polar group.

10. The cationically photopolymerizable composition of claim 9, wherein the polar group includes at least a carboxyl group.

* * * * *